(12) United States Patent
Hori et al.

(10) Patent No.: US 9,841,143 B2
(45) Date of Patent: Dec. 12, 2017

(54) SUCTION DEVICE AND SUCTION METHOD

(71) Applicants: IWATANI CORPORATION, Tokyo (JP); TOYOTA JIDOSHA KABUSHIKI KAISHA, Toyota-shi, Aichi-ken (JP)

(72) Inventors: Yoshihiro Hori, Amagasaki (JP); Yuu Matsuno, Amagasaki (JP); Hiroaki Nemoto, Tokyo (JP); Hideyo Omori, Susono (JP); Toshiyuki Kondo, Chiryu (JP)

(73) Assignees: TOYOTA JIDOSHA KABUSHIKI KAISHA, Toyota-shi (JP); IWATANI CORPORATION, Tokyo (JP)

( * ) Notice: Subject to any disclaimer, the term of this patent is extended or adjusted under 35 U.S.C. 154(b) by 0 days.

(21) Appl. No.: 14/789,122

(22) Filed: Jul. 1, 2015

(65) Prior Publication Data
US 2016/0010798 A1   Jan. 14, 2016

(30) Foreign Application Priority Data

Jul. 9, 2014  (JP) ................................ 2014-140983

(51) Int. Cl.
*F17C 5/04*   (2006.01)
(52) U.S. Cl.
CPC ............... *F17C 5/04* (2013.01); *Y02E 60/321* (2013.01)
(58) Field of Classification Search
CPC .................................. F17C 5/04; Y02E 60/321
USPC .................. 141/1, 4–5, 8, 65, 89–90, 93–95
See application file for complete search history.

(56) References Cited

U.S. PATENT DOCUMENTS

| 3,907,010 A | * | 9/1975 | Burtis ...................... B67D 7/54 141/207 |
| 4,262,712 A | * | 4/1981 | Young ...................... B67D 7/54 137/615 |
| 5,255,720 A | * | 10/1993 | McPherson ............. B65B 39/00 141/115 |
| 5,301,723 A | * | 4/1994 | Goode ...................... F17C 5/02 141/11 |
| 5,365,981 A | * | 11/1994 | Peschka .................... B60S 5/02 123/DIG. 12 |
| 5,385,178 A | * | 1/1995 | Bedi ........................ B60K 15/04 141/302 |
| 5,429,155 A | * | 7/1995 | Brzyski ................... F16L 37/35 137/614.04 |
| 5,996,649 A | * | 12/1999 | Sutton ..................... F17C 5/007 141/198 |
| 6,196,280 B1 | * | 3/2001 | Tate, Jr. ................. B60K 15/04 141/301 |

(Continued)

FOREIGN PATENT DOCUMENTS

| CN | 103797292 A | 5/2014 |
| CN | 103797292 B | 7/2015 |

(Continued)

*Primary Examiner* — Nicolas A Arnett
(74) *Attorney, Agent, or Firm* — Andrews Kurth Kenyon LLP

(57) ABSTRACT

A suction method that sucks inside of a filling nozzle used for supply of hydrogen by using a suction nozzle that is engaged with the filling nozzle, the suction method comprising: evacuating a vacuum chamber by using a vacuum pump; and sucking inside of the suction nozzle by using the evacuated vacuum chamber.

11 Claims, 20 Drawing Sheets

(56) References Cited

U.S. PATENT DOCUMENTS

| | | | | |
|---|---|---|---|---|
| 6,675,841 B2* | 1/2004 | Burns | ............... | B60K 15/03504 |
| | | | | 137/614.04 |
| 6,871,677 B2* | 3/2005 | Zerangue, Sr. | ......... | B67D 7/342 |
| | | | | 141/1 |
| 7,082,969 B1* | 8/2006 | Hollerback | ............... | B67D 7/04 |
| | | | | 141/38 |
| 8,307,863 B2* | 11/2012 | Noujima | .................... | C01B 3/26 |
| | | | | 141/100 |
| 8,776,843 B2* | 7/2014 | Komiya | .................... | B65B 3/04 |
| | | | | 141/383 |
| 2009/0025824 A1* | 1/2009 | Noujima | ................. | C01B 3/501 |
| | | | | 141/93 |
| 2013/0061983 A1 | 3/2013 | Komiya et al. | | |
| 2015/0129477 A1* | 5/2015 | Jones | ........................ | C02F 1/24 |
| | | | | 210/202 |

FOREIGN PATENT DOCUMENTS

| | | |
|---|---|---|
| DE | 12011104868 T5 | 11/2013 |
| DE | 112011104868 T8 | 2/2014 |
| JP | H11152196 A | 6/1999 |
| JP | 2013-164142 A | 8/2013 |
| JP | 5310877 B1 | 10/2013 |
| WO | 2013-038445 A1 | 3/2013 |

\* cited by examiner

SUCTION DEVICE AND SUCTION METHOD

CROSS-REFERENCE TO RELATED APPLICATIONS

The present application claims the priority based on Japanese Patent Application No. 2014-140983 filed on Jul. 9, 2014, the disclosure of which is hereby incorporated by reference in its entirety.

FIELD

The present disclosure relates to suction of the inside of a filling nozzle used for supply of hydrogen.

DESCRIPTION OF RELATED ART

A hydrogen dispenser located in a hydrogen station serves to fill high-pressure hydrogen into a tank of a fuel cell vehicle. The operator engages a filling nozzle of the hydrogen dispenser with a receptacle of the vehicle, as a preparation for the hydrogen filling. On completion of the hydrogen filling, the operator draws back and detaches the filling nozzle from the receptacle.

In order to suppress an increase in internal temperature of a hydrogen tank of a motor vehicle during hydrogen filling, hydrogen to be supplied from the hydrogen dispenser is generally precooled to about −20° C. to −40° C. Accordingly, the filling nozzle engaged with the receptacle is cooled down by low-temperature hydrogen during hydrogen filling. Such cooling causes dew condensation inside of the filling nozzle. Hydrogen filling into a next motor vehicle by using the filling nozzle which water adheres to by dew condensation may cause the water produced by dew condensation to be cooled down and frozen. Such freezing may cause a difficulty in detaching the nozzle from the receptacle.

In order to suppress such freezing, a known technique sucks the inside of the filling nozzle by means of a vacuum pump to remove water from the inside of the filling nozzle on every occasion of hydrogen supply to the vehicle (for example, WO 2013/038445A).

SUMMARY

An object is accordingly to enhance the flexibility of design of a suction device. One possible measure to provide the suction power required for water removal shortens a piping of connecting a vacuum pump with a suction nozzle. When the vacuum pump is located near to the suction nozzle, however, this constrains the design with restricted arrangement around the suction nozzle. Additionally, since the vicinity of the suction nozzle requires hydrogen explosion protection, the vacuum pump should also meet the requirement for hydrogen explosion protection.

When the vacuum pump is located distant away from the suction nozzle, on the other hand, this requires a longer piping and increases a pressure loss. In order to provide sufficient suction, the vacuum pump is required to have the high suction power. This results in size expansion of the vacuum pump. The design of the vacuum pump and the suction device accordingly has such restrictions and constrains. Other needs include downsizing of the suction device, cost reduction, resource saving, easy manufacture and improvement of convenience.

In order to solve at least part of the problems described above, the present disclosure may be implemented by the following aspects.

(1) According to one aspect, there is provided a suction device that sucks inside of a filling nozzle used for supply of hydrogen. The suction device may include a suction nozzle configured to be engaged with the filling nozzle; a vacuum chamber configured to suck inside of the suction nozzle; and a vacuum pump configured to evacuate the vacuum chamber. This aspect enhances the flexibility of design of the suction device. In this aspect, the vacuum chamber is used to suck the suction nozzle. This configuration ensures sufficient suction for water removal even when the vacuum pump has relatively low suction power and is placed distant from the suction nozzle. This is likely to prevent size expansion of the vacuum pump. In this aspect, the vacuum chamber and the vacuum pump may be located in a place that requires hydrogen explosion protection or in a place that does not require hydrogen explosion protection.

(2) In the suction device of the above aspect, at least either the vacuum chamber or the vacuum pump may be located in a place that does not require hydrogen explosion protection. In this aspect, at least either the vacuum chamber or the vacuum pump does not require hydrogen explosion protection. Additionally, this reduces the number of components that are located in the place that requires hydrogen explosion protection. This accordingly facilitates arrangement of the components in the place that requires hydrogen explosion protection.

(3) In the suction device of the above aspect, suction of the suction nozzle by the vacuum chamber may be performed in response to an operator's instruction and then performed again after a predetermined time interval. This aspect allows the water adhering to the suction nozzle to be sucked out again. The water may adhere to the inside of the suction nozzle not only during but after hydrogen filling described above.

(4) The suction device of the above aspect may further include a mechanism configured to change and set a depression angle of the suction nozzle. This aspect enables the opening of the suction nozzle to face in the direction suitable for the situation. For example, the opening of the suction nozzle may be set to face in the respective suitable directions when the operator engages the filling nozzle with the suction nozzle and when the suction by the vacuum chamber is performed.

(5) In the suction device of the above aspect, the mechanism may set the depression angle to face the suction nozzle upward during suction by the vacuum chamber, compared with a state that the suction nozzle and the filling nozzle are not engaged with each other. This aspect facilitates the operation for engagement and ensures effective water removal.

(6) In the suction device of the above aspect, the mechanism may set the suction nozzle to face in a horizontal direction when suction by the vacuum chamber is performed. This aspect ensures effective water removal, while suppressing an excessive load from being applied to a hose connected with the filling nozzle.

(7) In the suction device of the above aspect, the mechanism may set the depression angle to 45 degrees when suction by the vacuum chamber is not performed. This aspect facilitates the operation for engagement and reduces the load applied to the hose in the state that the filling nozzle is engaged with the suction nozzle.

(8) The suction device of the above aspect may include a plurality of the vacuum chambers. Even when evacuation of one vacuum chamber is not yet completed after water removal by this vacuum chamber, this aspect enables another vacuum chamber to be used for subsequent water removal.

(9) In the suction device of the above aspect, during suction of the suction nozzle by one of the plurality of vacuum chambers, another of the plurality of vacuum chambers may be evacuated by the vacuum pump. This aspect ensures the advantageous effects described above even when the number of vacuum pumps is less than the number of vacuum chambers.

(10) In the suction device of the above aspect, suction power by the vacuum chamber may be higher than suction power by the vacuum pump. This aspect does not require the vacuum pump to be driven during suction of the filling nozzle.

The disclosure may be implemented by various aspects other than those described above. For example, the disclosure may be implemented by a suction method, a program configured to implement the suction method, a non-transitory storage medium configured to store the program, as well as a vacuum chamber alone or a vacuum pump alone.

DESCRIPTION OF EMBODIMENTS

Figure 1:
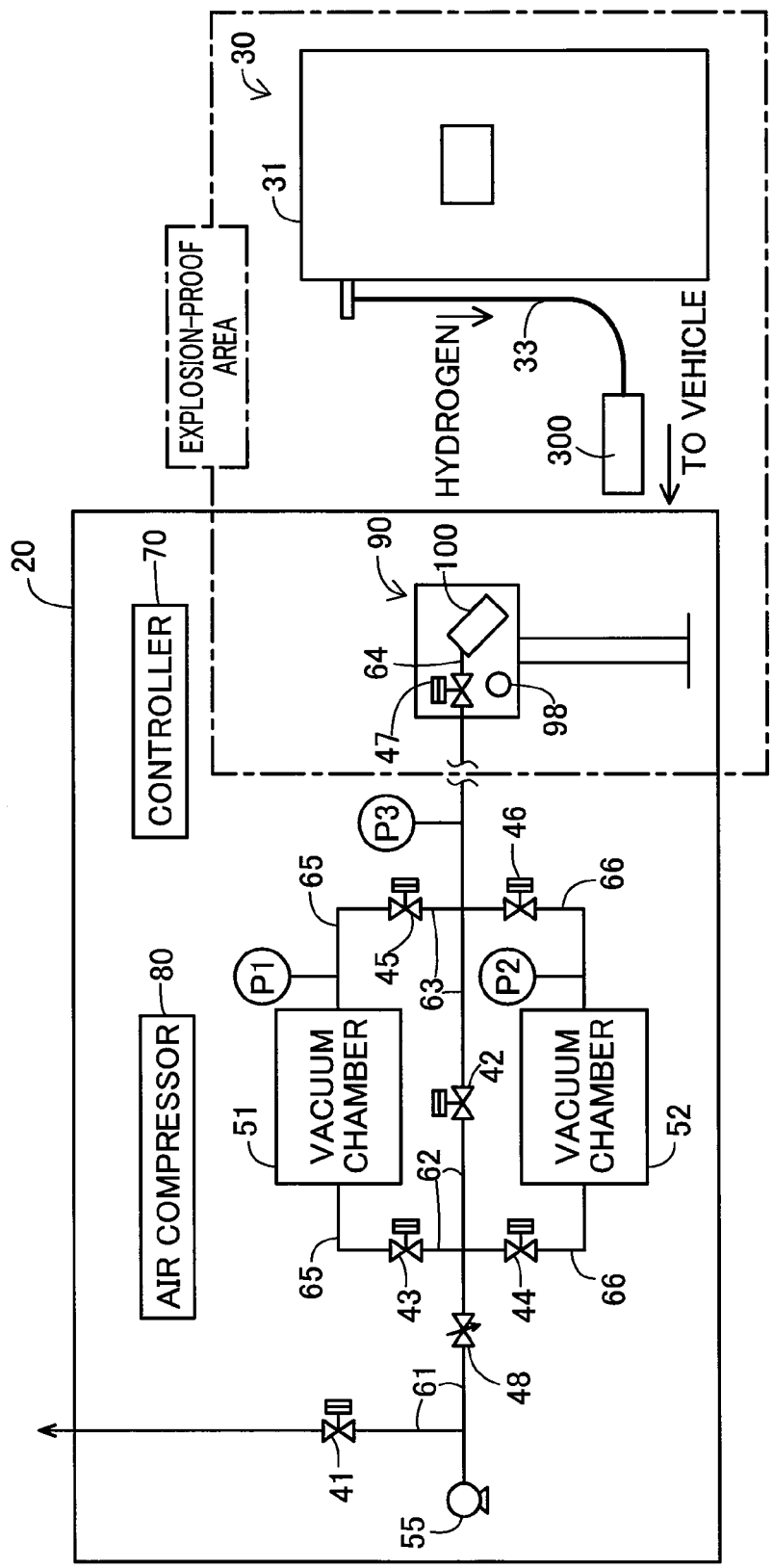
FIG. 1 is a block diagram illustrating a suction device and a hydrogen dispenser according to a first embodiment.

The following describes a first embodiment. FIG. 1 is a block diagram illustrating a suction device 20 and a hydrogen dispenser 30. The hydrogen dispenser 30 is equipment provided to supply high-pressure hydrogen to a fuel cell vehicle and is installed in a hydrogen station.

The hydrogen dispenser 30 includes a dispenser main body 31, a supply hose 33 and a filling nozzle 300. The supply hose 33 is a flexible hollow tube configured to connect the dispenser main body 31 with the filling nozzle 300. The dispenser main body 31 includes, for example, a tank that stores high-pressure hydrogen and is configured to supply hydrogen to a hydrogen tank of the fuel cell vehicle via the filling nozzle 300 and a receptacle of the fuel cell vehicle. The pressure of high-pressure hydrogen is 70 MPa in the first embodiment.

The suction device 20 is a device configured to suck the water adhering to the inside of the filling nozzle 300. The suction device 20 includes first to seventh valves 41 to 47, a flow regulating valve 48, first and second vacuum chambers 51 and 52, a vacuum pump 55, first to sixth pipes 61 to 66, a controller 70, an air compressor 80, a stand 90, a switch 98, a suction nozzle 100 and first to third pressure gauges P1 to P3.

The following describes the outline of operations of the suction device 20. The details of the operations will be described later. Prior to suction of the water accumulated in the filling nozzle 300, at least either one of the first and second vacuum chambers 51 and 52 is evacuated by means of the vacuum pump 55. The vacuum pump 55 has a pumping speed of 200 L/min (in the case of a power supply of 50 Hz) and an ultimate vacuum of $6.7 \times 10^{-2}$ Pa.

When the filling nozzle 300 is connected with the suction nozzle 100, the inside of the filling nozzle 300 is sucked by the evacuated vacuum chamber. Such suction causes the water accumulated in the filling nozzle 300 to flow with the air into the suction nozzle 100. The flowed-in water is accumulated in the vacuum chamber used for suction and is adequately discarded.

The first to the seventh valves 41 to 47, the flow regulating valve 48 and the first to the sixth pipes 61 to 66 are used for the evacuation and the suction described above. The first to the sixth pipes 61 to 66 are differentiated only for the purpose of discriminating respective equal pressure areas of the piping and are not necessarily provided as separate members. The first to the seventh valves 41 to 47 are opened and closed by means of the compressed air to open and close the flow path. The flow regulating valve 48 serves as a restriction of the flow. The degree of restriction of the flow regulating valve 48 is manually adjustable.

The air compressor 80 provides the compressed air. The compressed air is used to open and close the first to the seventh valves 41 to 47 and rotate the suction nozzle 100 (described later).

The controller 70 obtains the measured values of the first to the third pressure gauges P1 to P3 and controls opening and closing of the first to the seventh valves 41 to 47 and rotation of the suction nozzle 100, so as to control the evacuation and the suction described above. The switch 98 serves as an input interface to input control signals to the controller 70.

As shown in FIG. 1, the seventh valve 47, part of the third pipe 63, the fourth pipe 64, the switch 98 and the suction nozzle 100 are located on the stand 90. The hydrogen dispenser 30 and the stand 90 are placed in an explosion-proof area as shown in FIG. 1 to meet hydrogen explosion protection standards. More specifically, necessary measures for hydrogen explosion protection in a specified site are taken to satisfy specified hydrogen explosion protection standards and rules. The other components of the suction device 20 are placed outside of the explosion-proof area.

Figure 2:
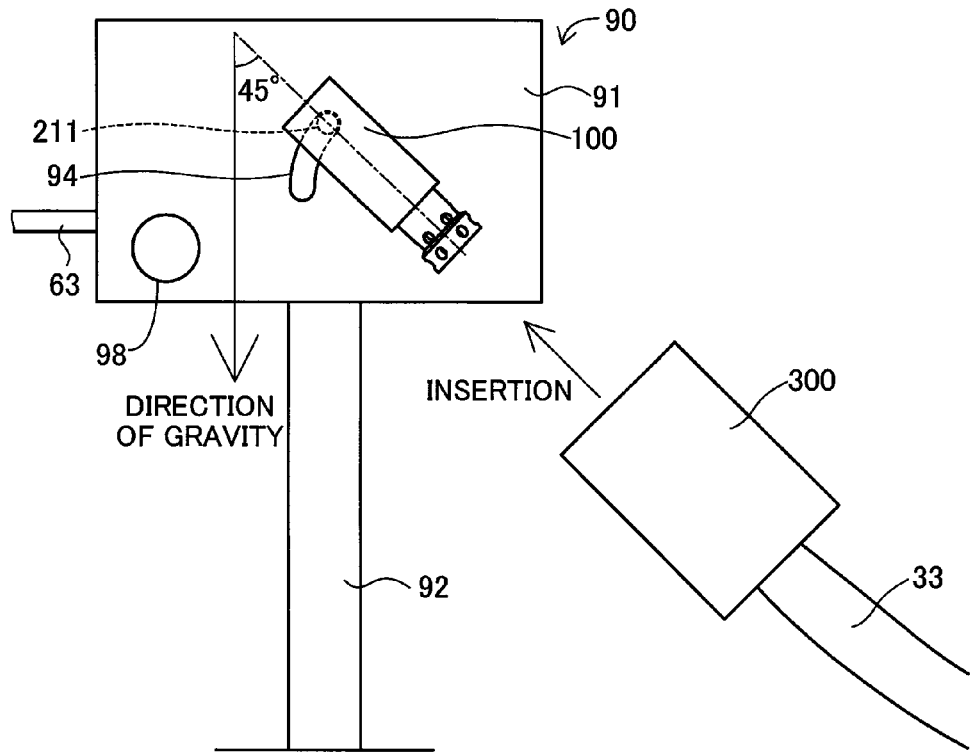
FIG. 2 is an enlarged view illustrating the vicinity of a stand.

FIG. 2 is an enlarged view illustrating the vicinity of the stand 90. The stand 90 includes a housing 91 and a leg 92. The housing 91 is a box in a rectangular parallelepiped shape. The switch 98 and the suction nozzle 100 are placed outside of the housing 91. FIG. 2 illustrates the state that the suction nozzle 100 is not engaged with the filling nozzle 300. This state is called standby state. In the standby state, the opening of the suction nozzle 100 faces obliquely downward at 45 degrees (at depression angle of 45 degrees).

Figure 3:
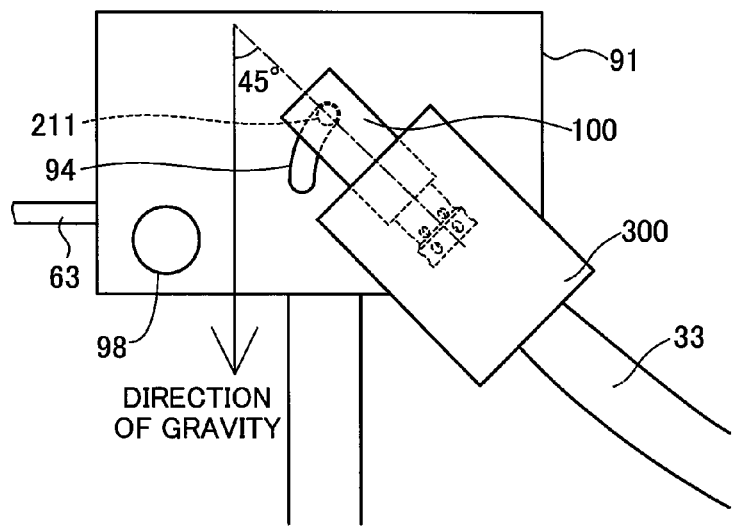
FIG. 3 is a diagram illustrating a state that a filling nozzle is inserted in a suction nozzle.

FIG. 3 illustrates the state that the filling nozzle 300 is inserted in the suction nozzle 100. The configuration that the opening of the suction nozzle 100 faces obliquely downward at 45 degrees facilitates the operator to readily insert the filling nozzle 300 into the suction nozzle 100.

Figure 4:
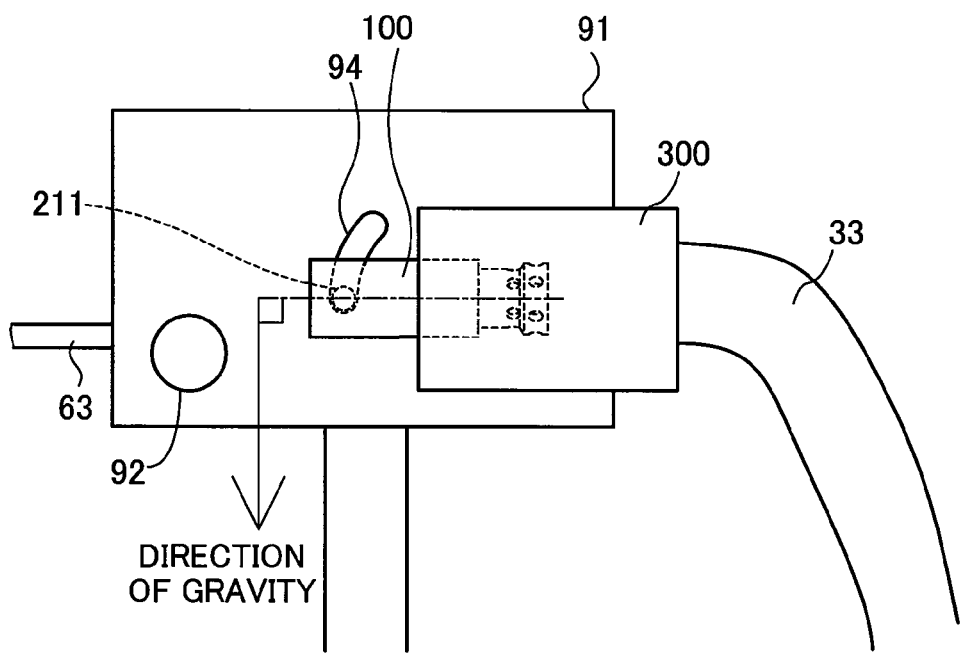
FIG. 4 is a diagram illustrating a state that the suction nozzle is rotated.

FIG. 4 illustrates the state that the suction nozzle 100 is rotated. The suction nozzle 100 is rotated to be prepared for suction of the filling nozzle 300. As shown in FIG. 4, rotation of the suction nozzle 100 causes the suction nozzle 100 to face in the horizontal direction. This accordingly causes the filling nozzle 300 to face in the horizontal direction.

Figure 5:
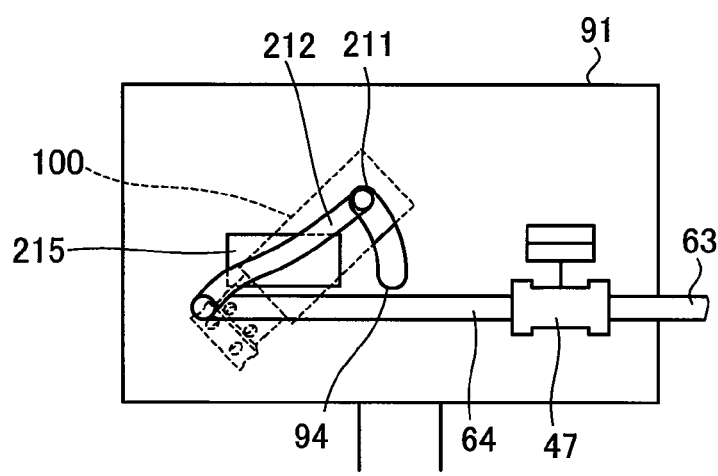
FIG. 5 is a diagram illustrating the inside of a housing in the state that the suction nozzle faces obliquely downward.
Figure 6:
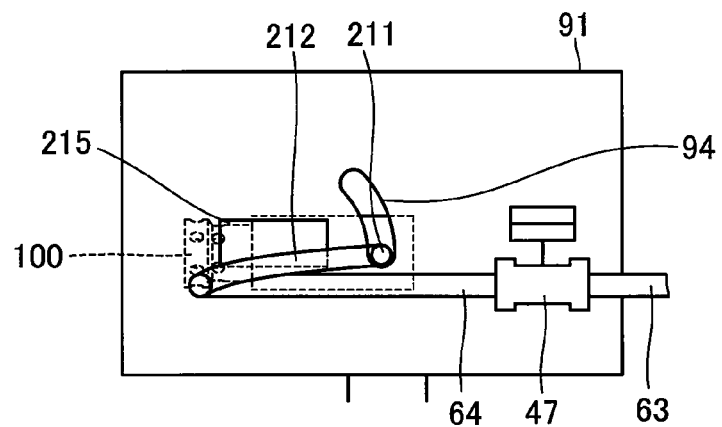
FIG. 6 is a diagram illustrating the inside of the housing in the state that the suction nozzle faces in a horizontal direction.

FIGS. 5 and 6 illustrate the inside of the housing 91. FIGS. 5 and 6 are diagrams seen from the side where the suction nozzle 100 is not placed. In the state of FIG. 5, the suction nozzle 100 faces obliquely downward at 45 degrees. In the state of FIG. 6, the suction nozzle 100 faces in the horizontal direction. The seventh valve 47 is placed inside of the housing 91 as shown in FIGS. 5 and 6.

A connection pipe 211 and a flexible pipe 212 form an internal flow path of the suction nozzle 100 and a flow path for connecting with the fourth pipe 64. The connection pipe 211 is formed to pass through from the surface of the housing 91 to the inside of the housing and is moved along a guide groove 94 to guide the rotation of the suction nozzle 100. The flexible tube 212 is a flexible metal pipe arranged to connect the connection tube 211 with the fourth pipe 64 and is bent accompanied with rotation of the suction nozzle 100. The actuator 215 is actuated by means of the compressed air to rotate the suction nozzle 100.

Figure 7:
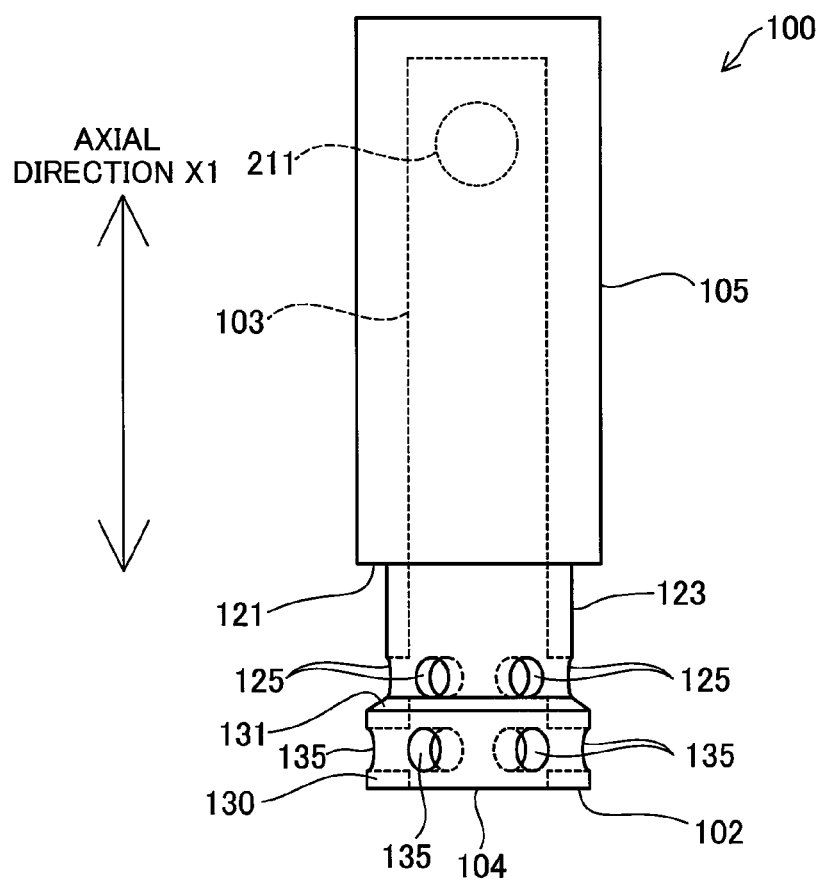
FIG. 7 is a diagram illustrating the schematic configuration of the suction nozzle.

FIG. 7 illustrates the schematic configuration of the suction nozzle 100. The suction nozzle 100 is formed in a hollow cylindrical shape and is made of a metal such as stainless steel. A hollow region 103 formed inside of the suction nozzle 100 communicates with the outside via an opening 104 formed at a leading end 102 of the suction nozzle 100.

The suction nozzle 100 has a step 121 and a reduced diameter portion 123 formed on the leading end 102-side of the step 121 by reducing the outer diameter of the nozzle. Additionally, a flange portion 130 having a larger outer diameter than that of the reduced diameter portion 123 is provided on the leading end 102-side of the reduced diameter portion 123. A step 131 formed by an inclined plane at the base of the flange portion 130 is engaged with projections 331 (shown in FIG. 8) of lock pins 330 (shown in FIG. 8) in the state that the suction nozzle 100 is engaged with the filling nozzle 300 (hereinafter this state is referred to as "engaged state"). The projections 331 are provided in the filling nozzle 300. Engagement of the step 131 and the projections 331 will be described later.

The suction nozzle 100 has a plurality of suction holes 125 in the reduced diameter portion 123 (hereinafter referred to as "reduced diameter portion suction holes 125"). The reduced diameter portion suction holes 125 are circular through holes. A plurality of (for example, six) reduced diameter portion suction holes 125 are arranged at equal intervals along the circumferential direction of an outer circumferential surface 105 of the suction nozzle 100. The hollow region 103 communicates with the outside via the reduced diameter portion suction holes 125.

The suction nozzle 100 also has a plurality of suction holes 135 in the flange portion 130 (hereinafter referred to as "flange portion suction holes 135"). Like the reduced diameter portion suction holes 125, the flange portion suction holes 135 are circular through holes, and a plurality of the flange portion suction holes 135 are arranged at equal intervals along the circumferential direction of the outer circumferential surface 105 of the suction nozzle 100.

Figure 8:
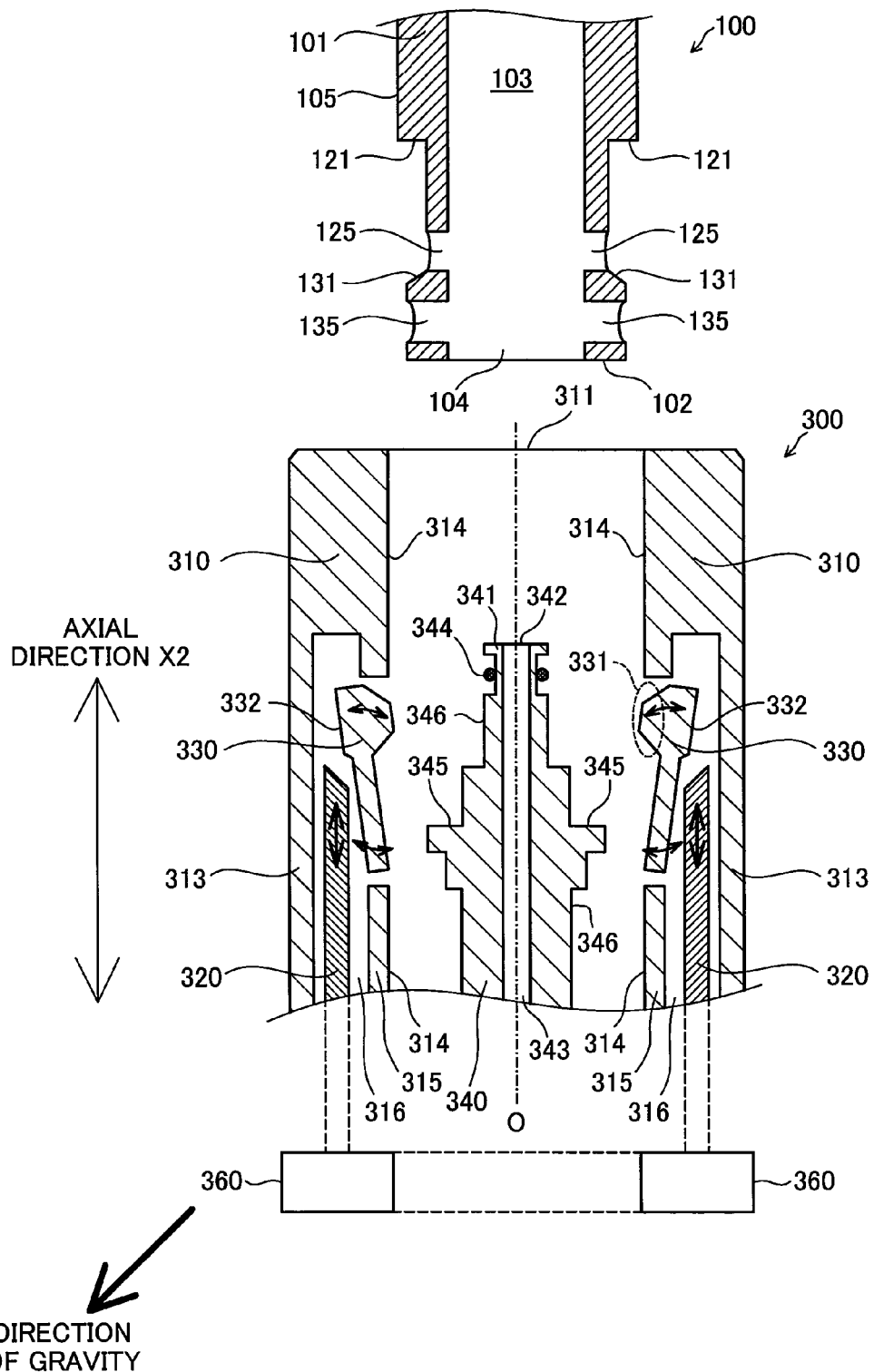
FIG. 8 is a diagram illustrating a standby state to be shifted to an engaged state.
Figure 9:
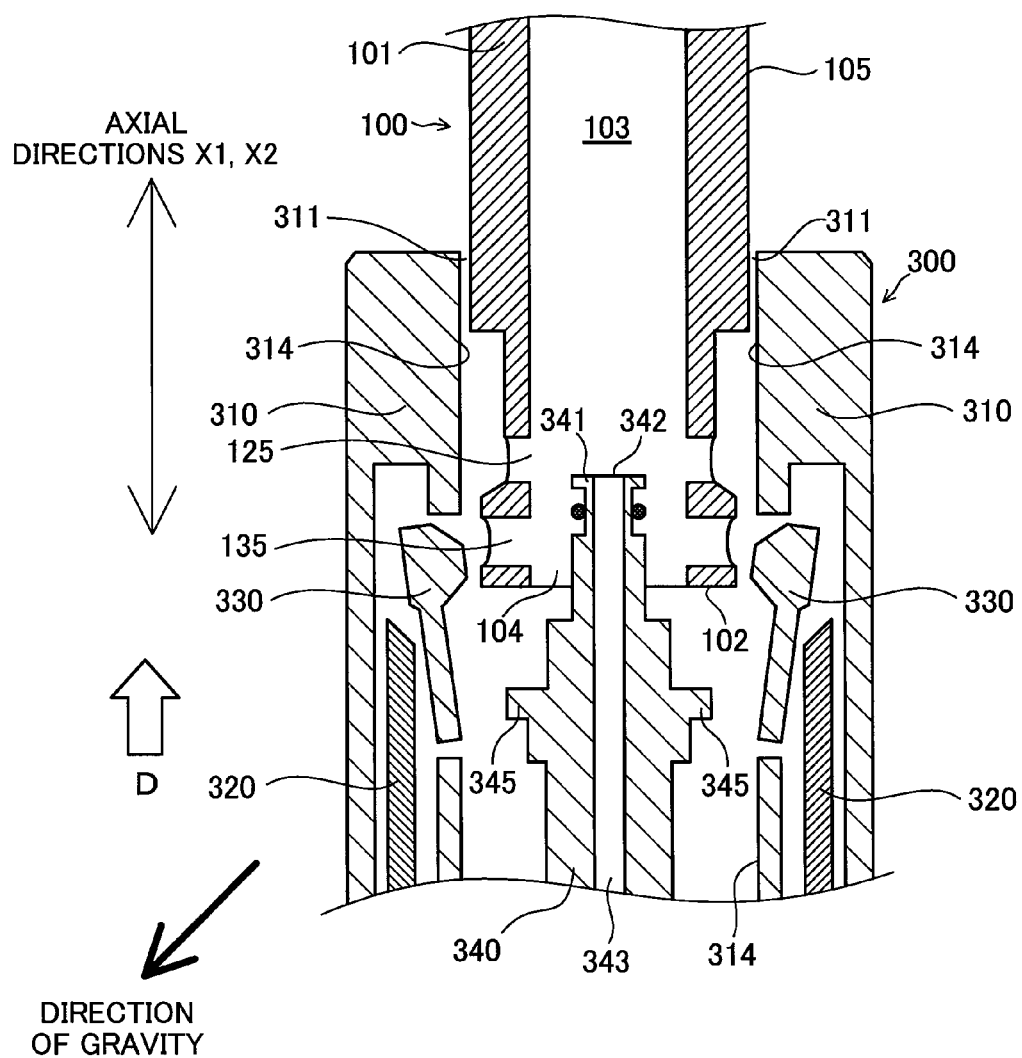
FIG. 9 is a diagram illustrating a state that the suction nozzle is inserted in an opening of the filling nozzle.
Figure 10:
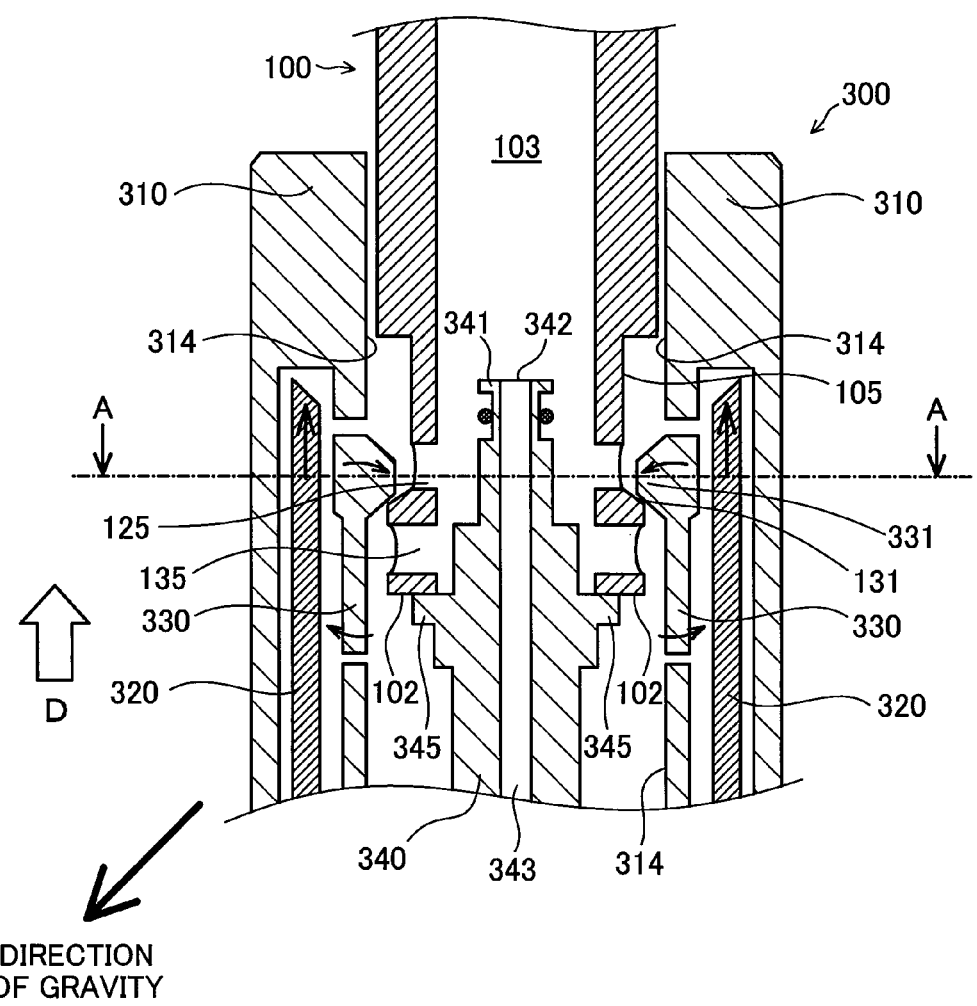
FIG. 10 is a sectional view illustrating the engaged state.

The following describes engagement between the filling nozzle 300 and the suction nozzle 100 with reference to FIGS. 8 to 10. FIGS. 8 to 10 illustrate the sectional configuration of the filling nozzle 300 and the suction nozzle 100. The filling nozzle 300 and the suction nozzle 100 shift from the standby state shown in FIG. 8 through the state shown in FIG. 9 to the engaged state shown in FIG. 10.

FIG. 8 illustrates the filling nozzle 300 and the suction nozzle 100 in the standby state. The filling nozzle 300 includes an outer tubular portion 310, a sleeve 320, lock pins 330 and an inner tubular portion 340. The outer tubular portion 310 is formed in a cylindrical shape and has an opening 311 at one end (upper side of FIG. 8) in its axial direction X2. The other end (not shown, lower side of FIG. 8) of the outer tubular portion 310 is closed. The outer tubular portion 310 at least partly has a multi-layered structure of an outer circumferential wall 313 and an inner circumferential wall 315, and has a cavity 316 provided between the outer circumferential wall 313 and the inner circumferential wall 315. More specifically, the outer tubular portion 310 includes the outer circumferential wall 313 formed in the tubular shape, the inner circumferential wall 315 formed on the inner side of the outer circumferential wall 313 and the cavity 316. The cavity 316 is formed between the outer circumferential wall 313 and the inner circumferential wall 315. The sleeve 320 in a tubular shape is placed in the cavity 316.

The sleeve pin 320 is provided as a member to press and move the lock pins 330 and is configured to be movable in the axial direction X2 (vertical direction of FIG. 8). The sleeve 320 is moved by a drive unit 360 such as a motor as power source. The drive unit 360 is controlled by the controller 70. The lock pins 330 are provided as members to lock the suction nozzle 100 or the receptacle. A plurality of (for example, six) lock pins 330 are arranged at equal intervals along the circumferential direction of an inner circumferential surface 314 of the outer tubular portion 310. The lock pins 330 are placed in recessed areas of the inner circumferential wall 315. Each of the lock pins 330 includes a projection 331 protruded in a direction toward a center axis O of the outer tubular portion 310, and a back face element 332 formed on a back face of the projection 331. When the sleeve 320 comes into contact with the back face element 332, the lock pin 330 is swung to move the projection 331 toward the center axis O of the outer tubular portion 310. This causes the projection 331 to be protruded from the inner circumferential surface 314 of the outer tubular portion 310.

The inner tubular portion 340 is formed in a tubular shape and is placed on the inner side of the outer tubular portion 310 to have its center axis equal to the center axis O of the outer tubular portion 310. The inner tubular portion 340 has its base end (not shown) fixed to the outer tubular portion 310 and a leading end 341 arranged to face the opening 311 of the outer tubular portion 310. The inner tubular portion 340 includes a supply port 342, a supply tube 343, an O ring 344 and an abutting element 345. The supply tube 343 communicates with the outside via the supply port 342 formed at the leading end 341 of the inner tubular portion 340 and is connected with the supply hose 33 (shown in FIG. 1) at the base end of the inner tubular portion 340. Hydrogen supplied from the dispenser main body 31 is released from the supply port 342.

The O ring 344 is a ring-shaped sealing member made of, for example, a rubber or a resin, and is placed around an outer circumferential surface 346 in a neighborhood of the leading end 341. The O ring 344 is configured to seal the clearance between the filling nozzle 300 and the receptacle in the engaged state and improve the air tightness. The abutting element 345 is formed in a flange-like shape and is formed in the middle of the leading end 341 and the base end of the inner tubular portion 341. The leading end of the suction nozzle 100 or the leading end of the receptacle comes into contact with the abutting element 345 in the engaged state.

FIG. 9 illustrates the state that the suction nozzle 100 is inserted in the opening 311 of the filling nozzle 300. In order to achieve the engaged state, the leading end 102 of the suction nozzle 100 is inserted in the opening 311 of the filling nozzle 300, and the filling nozzle 300 is moved in an illustrated direction of arrow D (upward in FIG. 9). The direction of arrow D is a direction along axial directions X1 and X2 and is a direction of making the opening 311 of the filling nozzle 300 approach the depth of the hollow region 103 of the suction nozzle 100. When the filling nozzle 300 moves in the direction of arrow D, the leading end 341 of the inner tubular portion 340 is inserted into the hollow region 103 of the suction nozzle 100 via the opening 104.

FIG. 10 is a sectional view illustrating the engaged state. When the abutting element 345 of the inner tubular portion 340 comes into contact with the leading end 102 of the suction nozzle 100, the motion of the filling nozzle 300 in the direction of arrow D is restricted. The state that the suction nozzle 100 is pressed into the depth of the filling nozzle 300 is the engaged state. In the engaged state, when the sleeve 320 is moved in the direction of arrow D by the drive unit 360, the projections 331 of the lock pins 330 are pressed inward in the filling nozzle 300 by the sleeve 320 to be engaged with the step 131 of the suction nozzle 100. This engagement prevents the filling nozzle 300 from moving in an opposite direction to the direction of arrow D (downward in FIG. 10) and thereby prevents the filling nozzle 300 from being detached from the suction nozzle 100. Hereinafter this state is called "locked state". The state that allows the filling nozzle 300 to be detached from the suction nozzle 100 is called "unlocked state".

As shown in FIG. 10, the outer circumferential surface 105 of the suction nozzle 100 and the inner circumferential surface 314 of the filling nozzle 300 are arranged to face each other in the engaged state. The reduced diameter portion suction holes 125 and the flange portion suction holes 135 of the suction nozzle 100 are configured to face the inner circumferential surface 314 and the lock pins 330 of the filling nozzle 300 in the engaged state. More specifically, the reduced diameter portion suction holes 125 and the flange portion suction holes 135 of the suction nozzle 100 are configured such that the distance in the axial direction X1 between the leading end 102 of the suction nozzle 100 and a farther end of the reduced diameter portion suction holes 125 and the flange portion suction holes 135 is included in or approximate to the distance in the axial direction X2 between the abutting element 345 of the inner tubular portion 340 and a farther end of the lock pins 330. This configuration enables the water to be effectively sucked from the vicinity of the lock pins 330 where the water is likely to be accumulated.

Figure 11:
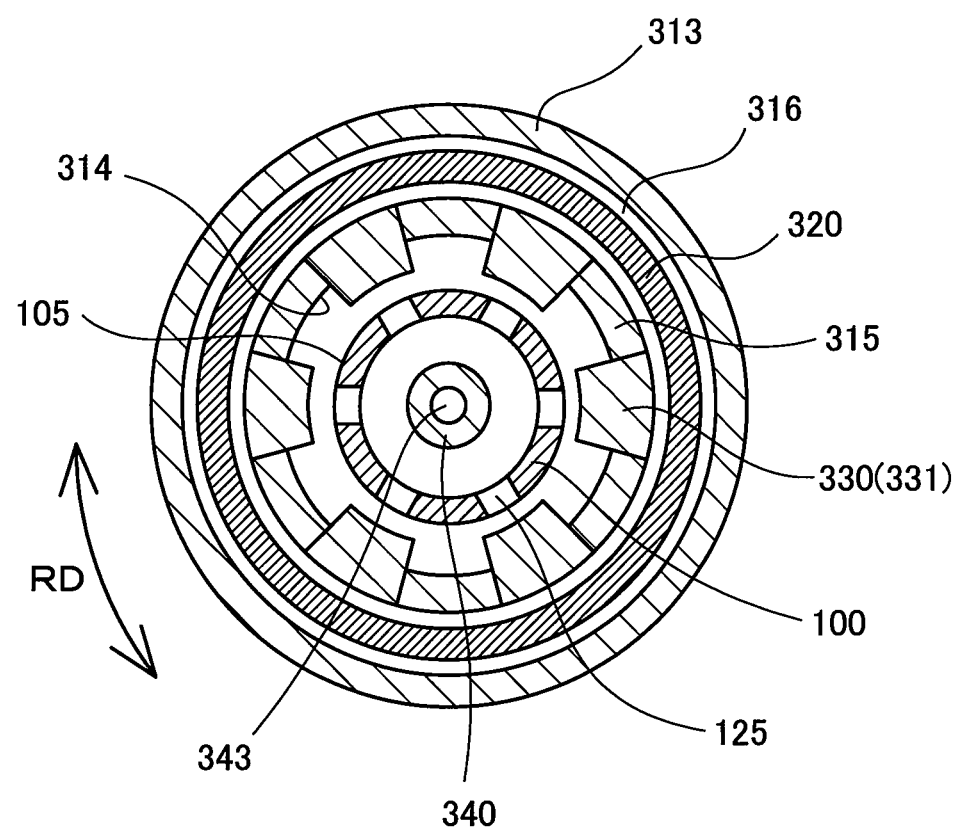
FIG. 11 is a cross sectional view taken on a line A-A in FIG. 10.

FIG. 11 illustrates a cross section taken on a line A-A of FIG. 10. The reduced diameter portion suction holes 125 are configured to face the projections 331 of the lock pins 330 in the engaged state. The positional relationship of the suction nozzle 100 relative to the filling nozzle 300 in their circumferential direction RD is determined in advance by any of various methods. For example, the suction nozzle 100 and the filling nozzle 300 may be provided with engagement elements to restrict their relative motions in the circumferential direction RD and thereby maintain their relative positions in the predetermined positional relationship. The engagement elements may include, for example, a groove (or grooves) formed in one of the suction nozzle 100 and the filling nozzle 300 to be extended in the axial directions X1 and X2 and a projection (or projections) formed on the other of the suction nozzle 100 and the filling nozzle 300 to be slid in the groove (or grooves).

Figure 12:
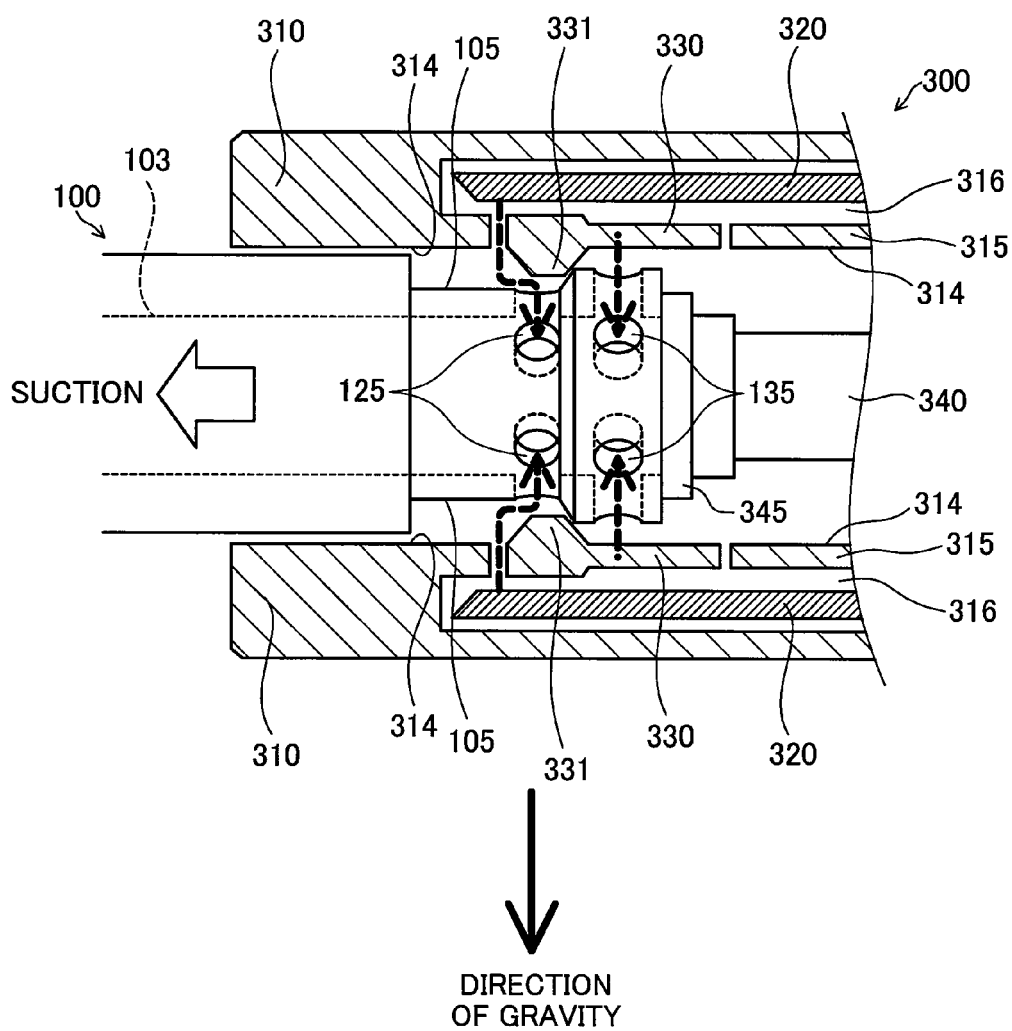
FIG. 12 is a diagram illustrating a state that the suction nozzle sucks the inside of the filling nozzle.

FIG. 12 illustrates the state that the suction nozzle 100 sucks the inside of the filling nozzle 300. When the suction nozzle 100 sucks the inside of the filling nozzle 300 in the engaged state by using the vacuum chamber that is evacuated in advance, the water adhering to the inside of the filling nozzle 300 is sucked out. More specifically, the suction nozzle 100 sucks out the water adhering to the inner circumferential surface 314 of the outer tubular portion 310 and the water adhering to the lock pins 330, as well as the water accumulated in the cavity 316 of the outer tubular portion 310 and the water accumulated between the outer circumferential surface 105 of the suction nozzle 100 and the inner circumferential surface 314 of the outer tubular portion 310. Especially, the locked state facilitates suction of the water from the cavity 316 behind the lock pins 330. The water sucked from the reduced diameter portion suction holes 125 and the flange portion suction holes 135 is flowed through the hollow region 103 toward the suction device 20.

This configuration allows for suction in the state that both the suction nozzle 100 and the filling nozzle 300 face in the horizontal direction. Compared with suction in the state that the suction nozzle 100 faces obliquely downward at 45 degrees, this facilitates suction of the water by the effect of gravitational force. Arrangement that the suction nozzle 100 faces upward relative to the horizontal direction farther facilitates removal of the water. This arrangement that the suction nozzle 100 faces upward relative to the horizontal direction, however, causes the supply hose 33 to be significantly bent and applies a load to the supply hose 33. The supply hose 33 is designed to be resistant to the high pressure and receives a load when being bent. By considering the good balance, the first embodiment accordingly employs the arrangement that the suction nozzle 100 faces in the horizontal direction during suction.

Figure 13:
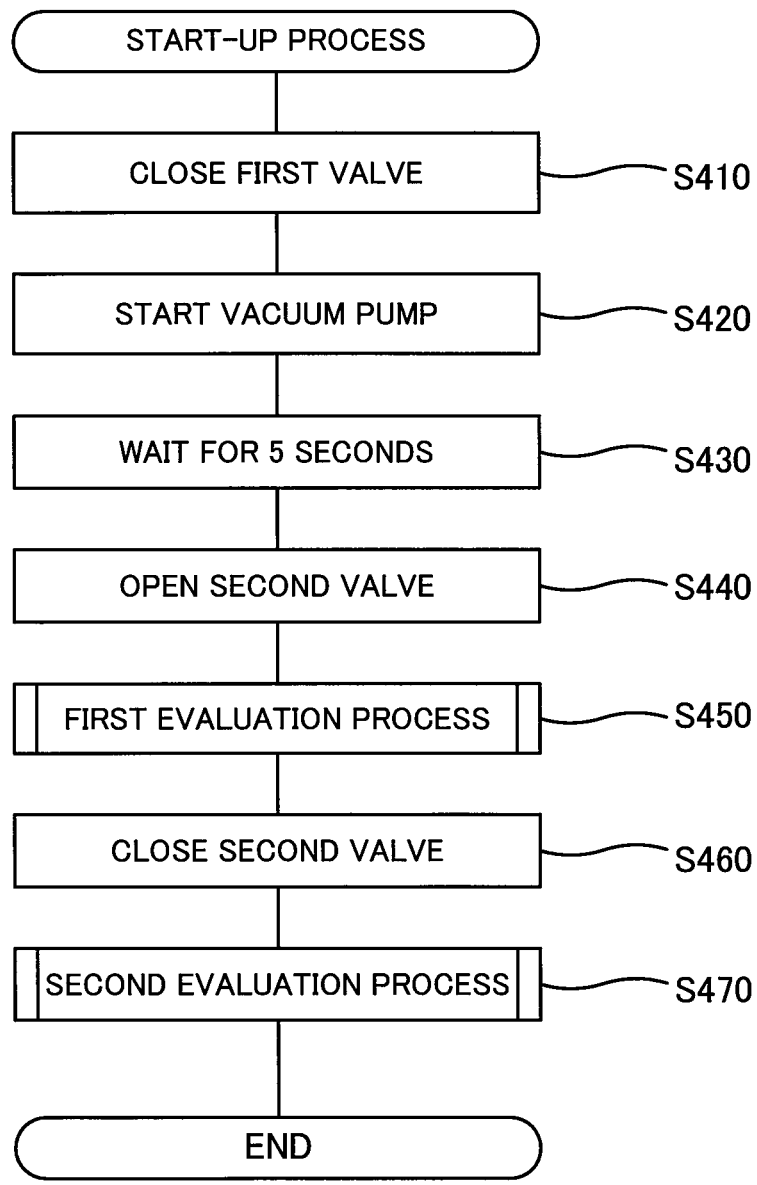
FIG. 13 is a flowchart showing a start-up process.

The following describes detailed procedures of the evacuation of the first and the second vacuum chambers 51 and 52 and the suction of the filling nozzle 300 described above. FIG. 13 is a flowchart showing a start-up process. The start-up process is triggered by starting the suction device 20 and is performed by the controller 70.

The controller 70 first closes the first valve 41 (step S410). The first valve 41 is kept open when the suction device 20 is at a stop. The other valves are kept closed, on the other hand, when the suction device 20 is at a stop. The other valves are closed, in order to maintain the first and the second vacuum chambers 51 and 52 in the evacuated state while the suction device 20 is at a stop.

The controller 70 subsequently starts the vacuum pump 55 (step S420) and evacuates the first pipe 61 and the second pipe 62 after waiting for 5 seconds (step S430). The controller 70 then opens the second valve 42 (step S440) and performs a first evacuation process (step S450).

Figure 14:
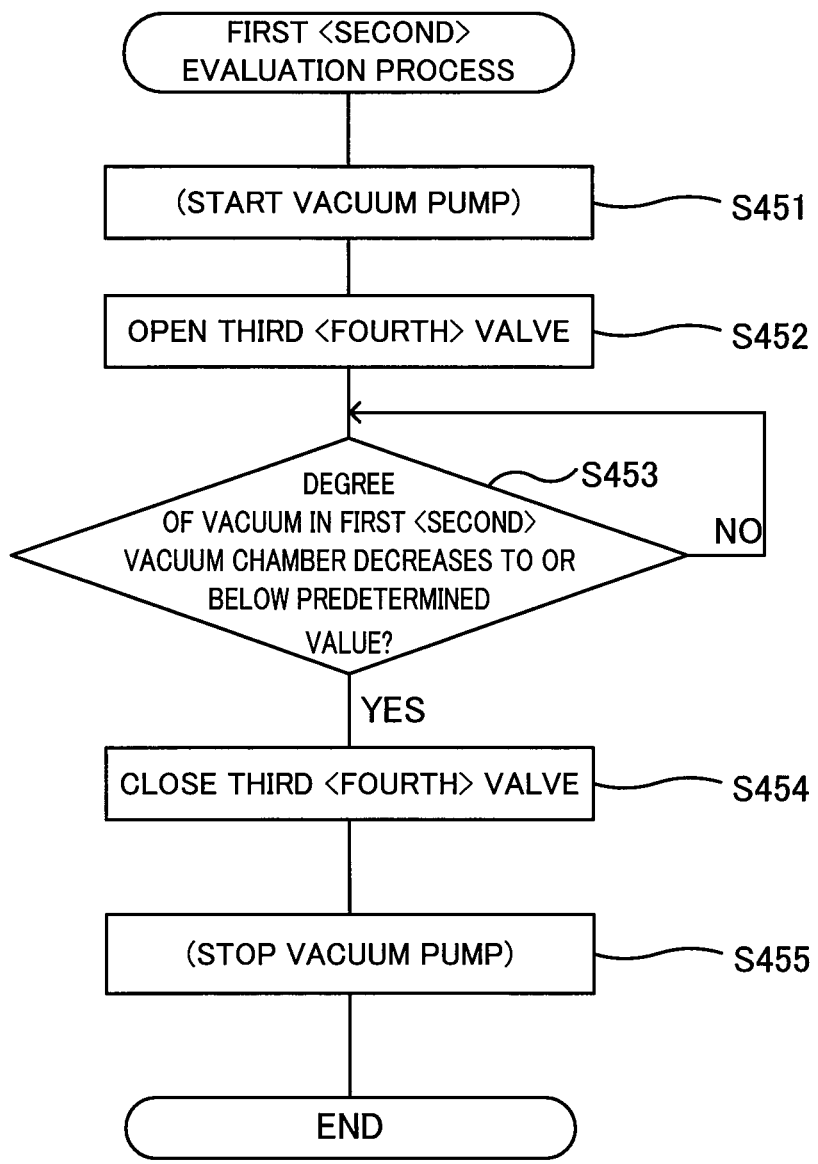
FIG. 14 is a flowchart showing first and second evacuation processes.

FIG. 14 is a flowchart showing first and second evacuation processes. The first and second evacuation processes are similar to each other and are thus collectively shown in FIG. 14. In the flowchart of FIG. 14, the angled brackets correspond to the second evacuation process. In the following description, the second evacuation process is also shown in the angled brackets.

The controller 70 first starts the vacuum pump 55 (step S451). When the vacuum pump 55 has already been started and is operated, however, the processing of step S451 is to be skipped. For example, the processing of step S451 is skipped when the first evacuation process or the second evacuation process is called in the start-up process or when the first evacuation process (step S601) or the second evacuation process (602) is performed immediately after a piping evacuation process in a water removal process (FIG. 15), but is performed at step S540 or at step S550 in the water removal process.

The controller 70 subsequently opens the third valve 43 <fourth valve 44> (step S452). When the second valve 42 and the third valve 43 <fourth valve 44> are opened, the first vacuum chamber 51 <second vacuum chamber 52> is evacuated.

The controller 70 subsequently determines whether the degree of vacuum of the first vacuum chamber 51<second vacuum chamber 52> decreases to or below a predetermined value (for example, −90 kPaG) (step S453). This determination is based on the pressure value obtained from the pressure gauge P1 <pressure gauge P2>. Until the degree of vacuum decreases to or below the predetermined value (step S453: NO), the controller 70 repeats the processing of step S453. When the degree of vacuum decreases to or below the predetermined value (step S453: YES), the controller 70 closes the third valve 43 <fourth valve 44> (step S454).

The controller 70 then stops the vacuum pump 55 (step S455). When subsequent evacuation is required, however, the vacuum pump 55 is not stopped. For example, the vacuum pump 55 is not stopped in the first evacuation process (step S450) in the start-up process but is stopped in the second evacuation process (step S470) in the start-up process.

The first evacuation process (step S450) in the start-up process evacuates the first vacuum chamber 51, the second pipe 62, the third pipe 63 and the fifth pipe 65. Referring back to FIG. 13, after the first evacuation process (step S450), the controller 70 closes the second valve 42 (step S460) and then performs the second evacuation process (step S470). The details of the second evacuation process are described above with reference to FIG. 14.

Completion of the start-up process completes preparation for suction of the filling nozzle 300. More specifically, completion of the first evacuation process at step S450 completes preparation for suction of the filling nozzle 300. Completion of preparation for suction may be notified by means of, for example, a lamp.

In the first embodiment, both the first and the second vacuum chambers 51 and 52 have a capacity of 40 liters. It takes about 25 seconds from opening the fourth valve 44 at step S452 to the positive determination at step S453 in the second evacuation process.

Figure 15:
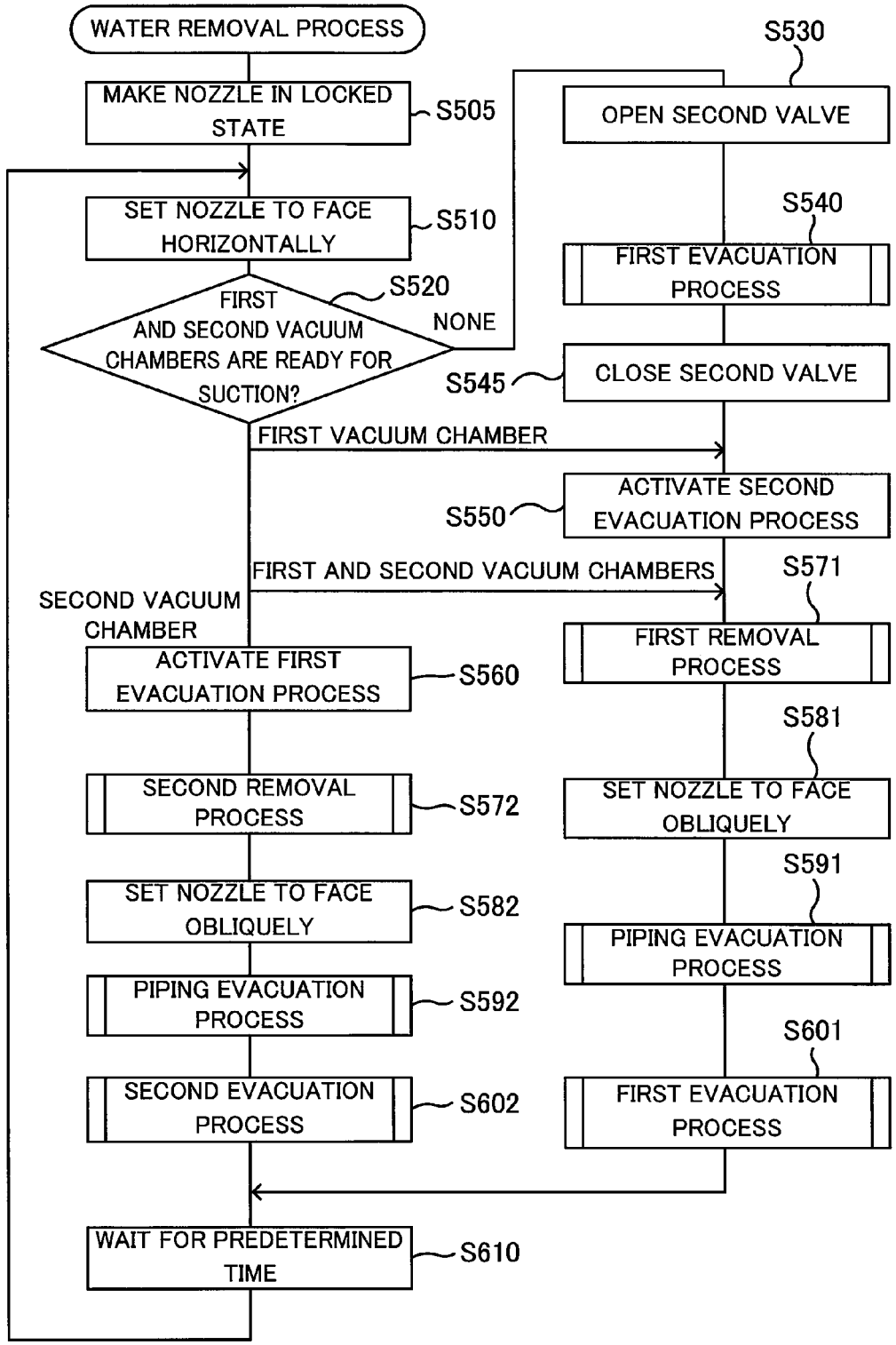
FIG. 15 is a flowchart showing a water removal process.

FIG. 15 is a flowchart showing a water removal process. The controller 70 starts the water removal process in response to the operator's operation of the switch 98 to enter a start command. The water removal process is performed repeatedly as described later in detail and is terminated in response to the operator's reoperation of the switch 98.

The controller 70 first makes the suction nozzle 100 and the filling nozzle 300 in the locked state (step S505) and sets the suction nozzle 100 to face in the horizontal direction (step S510). The controller 70 subsequently determines whether the first vacuum chamber 51 and the second vacuum chamber 52 are ready for suction (step S520). The determination of being ready for suction is based on whether the degree of vacuum decreases to or below the predetermined value.

When both the first vacuum chamber 51 and the second vacuum chamber 52 are ready for suction (step S520: FIRST AND SECOND VACUUM CHAMBERS), the controller 70 performs a first removal process (step S571). The first suction after completion of the start-up process follows this processing flow.

Figure 16:
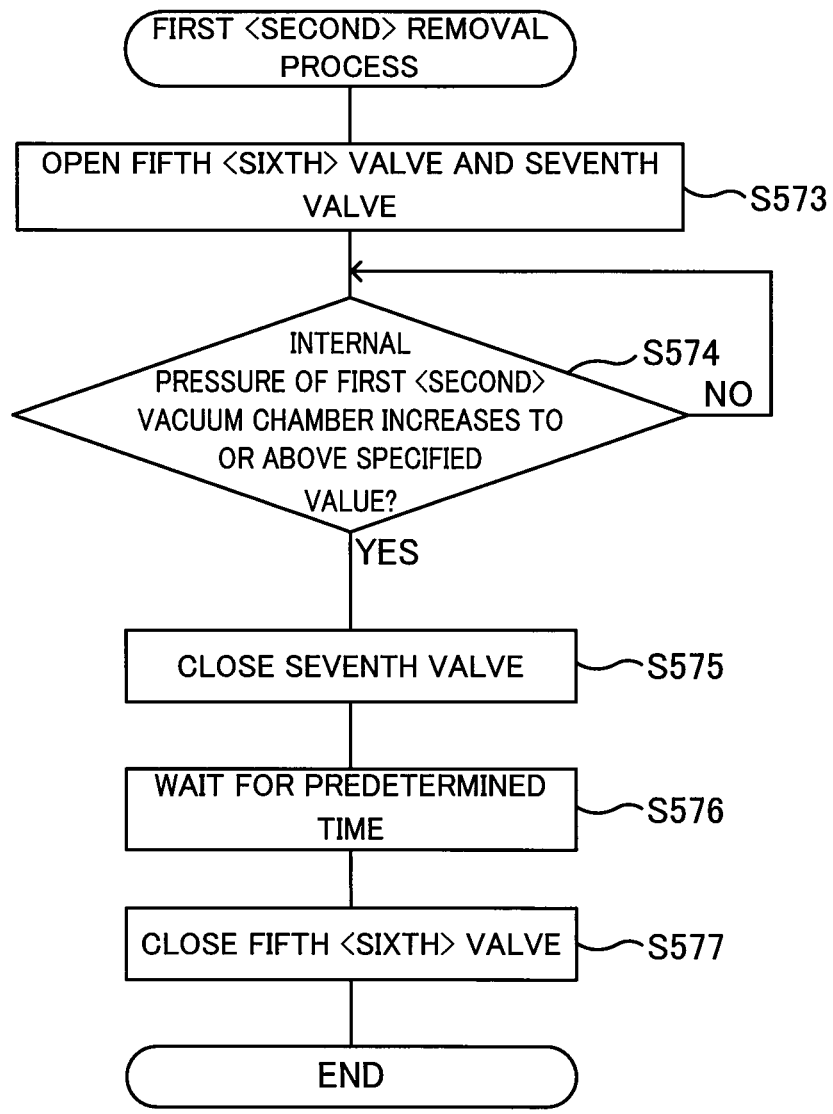
FIG. 16 is a flowchart showing first and second removal processes.

FIG. 16 is a flowchart showing first and second removal processes. The first and second removal processes are similar to each other and are thus collectively shown in FIG. 16. In the flowchart of FIG. 16, the angled brackets correspond to the second removal process. In the following description, the second removal process is also shown in the angled brackets.

The controller 70 first opens the fifth valve 45 <sixth valve 46> and the seventh valve 47 (step S573). Such valve-opening at step S573 allows for the suction described above with reference to FIG. 12. The suction increases the internal pressure of the first vacuum chamber 51 <second vacuum chamber 52>.

The controller 70 subsequently determines whether the internal pressure of the first vacuum chamber 51 <second vacuum chamber 52> increases to or above a specified value (for example, −18 kPaG) (step S574). The determination of step S574 is performed for determining whether suction is performed sufficiently or not and is based on the measurement value of the pressure gauge P1 <pressure gauge P2>. Until the internal pressure increases to or above the specified value (step S574: NO), the controller 70 repeats the processing of step S574.

When the internal pressure increases to or above the specified value (step S574: YES), the controller 70 closes the seventh valve 47 (step S575). In the first embodiment, it takes about 10 to 14 seconds before the internal pressure increases to or above the specified value. The suction time is preferably in an adequate range. The excessively long suction time may reduce the suction power immediately after a start of suction. The excessively short suction time terminates suction in a short time and may, on the other hand, cause ineffective suction. The short piping from the suction nozzle 100 to the first vacuum chamber 51 reduces the pressure loss in the piping and thereby reduces the time required for suction.

The controller 70 subsequently waits for a predetermined time in order to stabilize the internal pressure of the piping (step S576) and closes the fifth valve 45 <sixth valve 46> (step S577).

Referring back to FIG. 15, after completion of the first removal process (step S571), the controller 70 sets the suction nozzle 100 to face obliquely downward at 45 degrees (step S581). The processing of step S581 is performed for the purpose of reducing the load applied to the supply hose 33. The controller 70 subsequently performs a piping evacuation process (step S591).

Figure 17:
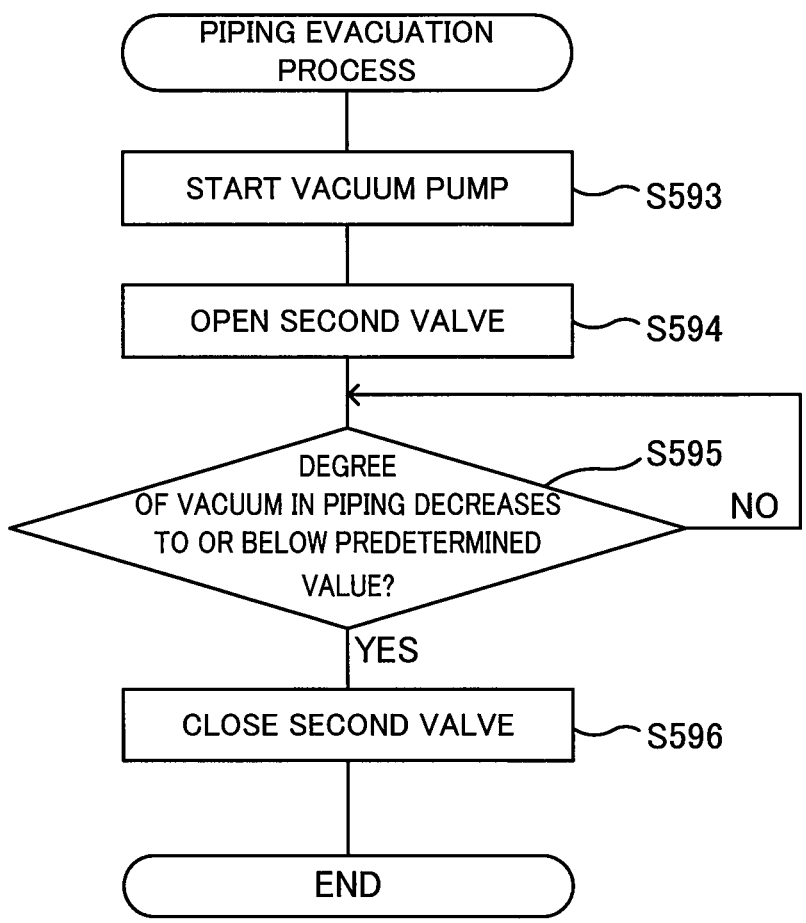
FIG. 17 is a flowchart showing a piping evacuation process.

FIG. 17 is a flowchart showing the piping evacuation process. The controller 70 first starts the vacuum pump 55 (step S593) and opens the second valve 42 (step S594). The controller 70 subsequently determines whether the degree of vacuum in the second and the third pipes 62 and 63 decreases to or below a predetermined value (step S595). This determination is based on the measurement value of the pressure gauge P3. Until the degree of vacuum decreases to or below the predetermined value (step S595: NO), the controller 70 repeats the processing of step S595.

When the degree of vacuum decreases to or below the predetermined value (step S595: YES), the controller 70 closes the second valve 42 (step S596).

Referring back to FIG. 15, after completion of the piping evacuation process (step S591), the controller 70 performs the first evacuation process (step S601) and returns to step S510 after waiting for a predetermined time (step S610). The controller 70 waits for the predetermined time, for the purpose of adjustment of the repeating cycle of water removal. The above series of steps is repeated until the operator's reoperation of the switch 98 to enter an end command.

In response to the operator's reoperation of the switch 98 to enter an end command, the controller 70 immediately terminates the water removal process and sets the suction nozzle 100 to face obliquely downward at 45 degrees and makes the suction nozzle 100 and the filling nozzle 300 in the unlocked state. This allows the operator to detach the filling nozzle 300 from the suction nozzle 100 and use the detached filling nozzle 300 for filling hydrogen.

When the water removal process is terminated, the controller 70 starts the start-up process to be prepared for a next suction.

Unlike the start-up process, the water removal process performs the first evacuation process after evacuation of the second and the third pipes 62 and 63 by the piping evacuation process. This is because evacuation of the second and the third pipes 62 and 63 allows for suction by the second vacuum chamber 52. This reduces the time period before none of the first vacuum chamber 51 and the second vacuum chamber 52 is ready for suction.

When only the first vacuum chamber 51 is ready for suction (step S520: FIRST VACUUM CHAMBER), on the other hand, the controller 70 activates the second evacuation process as a separate flow (step S550) and goes to step S571 (first removal process). This enables the second evacuation process to be simultaneously performed with the first removal process.

When only the second vacuum chamber 52 is ready for suction (step S520: SECOND VACUUM CHAMBER), the controller 70 activates the first evacuation process as a separate flow (step S560) and performs the second removal process (step S572). The controller 70 subsequently sets the suction nozzle 100 to face obliquely downward at 45 degrees (step S582) and performs the piping evacuation process (step S592). The controller 70 then performs the second evacuation process (step S602) and goes to step S610.

When none of the first and second vacuum chambers 51 and 52 is ready for suction (step S520: NONE), the controller 70 opens the second valve 42 (step S530), performs the first evacuation process (step S540), closes the second valve 42 (step S545) and goes to step S550.

The first embodiment described above has at least the following advantageous effects.

(A) Even in the case that the vacuum pump 55 has relatively low pumping power, suction of the suction nozzle 100 by using the first vacuum chamber 51 <second vacuum chamber 52> ensures the sufficient water removal effect. The sufficient water removal effect is attributed to an abrupt decrease of the internal pressure of the suction nozzle 100 and generation of instantaneously high suction power immediately after opening of the third valve 43 <fourth valve 44>. This suction power exceeds the pumping power of the vacuum pump 55. The suction power exceeding the pumping power of the vacuum pump 55 is generated since the vacuum pump 55 evacuates the vacuum chamber of the large capacity over a certain time period and then opens the vacuum chamber in a short time.

(B) The first and the second vacuum chambers 51 and 52 and the vacuum pump 55 are all placed in the non-explosion-proof area and accordingly have the simplified design. These components are allowed to be placed in the non-explosion-proof area, since the high suction power described above ensures the sufficient water removal even when the long piping has an increased pressure loss.

(C) The first removal process or the second removal process is repeatedly performed to remove the water accumulated after the previous water removal. Accumulation of the water after the water removal may be attributed to dew condensation or water entering the filling nozzle 30 by rainfall. Dow condensation may occur since the temperature of the filling nozzle 300 is low immediately after hydrogen filling.

(D) Dust can be removed along with water. The dust included in the water by dew condensation is likely to adhere to the filling nozzle 300 after vaporization of water. The remaining dust may enter hydrogen as impurity or may lead to invasion of the air into hydrogen.

(E) The arrangement that the suction nozzle 100 faces obliquely downward at 45 degrees facilitates the operation of engaging the filling nozzle 300 with the suction nozzle 100.

(F) The suction nozzle 100 is set to face in the horizontal direction during suction of the filling nozzle 300 by the suction nozzle 100. This ensures the more effective water removal, compared with the arrangement that the suction nozzle 100 faces obliquely downward at 45 degrees.

(G) The vacuum pump 55 is located at a distant place. This allows the mechanism of rotating the suction nozzle 100 (FIGS. 5 and 6) to be arranged without considering the interference with the vacuum pump 55.

(H) Providing the two vacuum chambers shortens the standby time between completion of a suction and start of a next suction.

(I) Reducing the ON/OFF frequency of the vacuum pump 55 decreases the load of the vacuum pump 55. The ON/OFF frequency is reduced since evacuation of the two vacuum chambers is performed successively in the start-up process and in the water removal process as much as possible.

Figure 18:
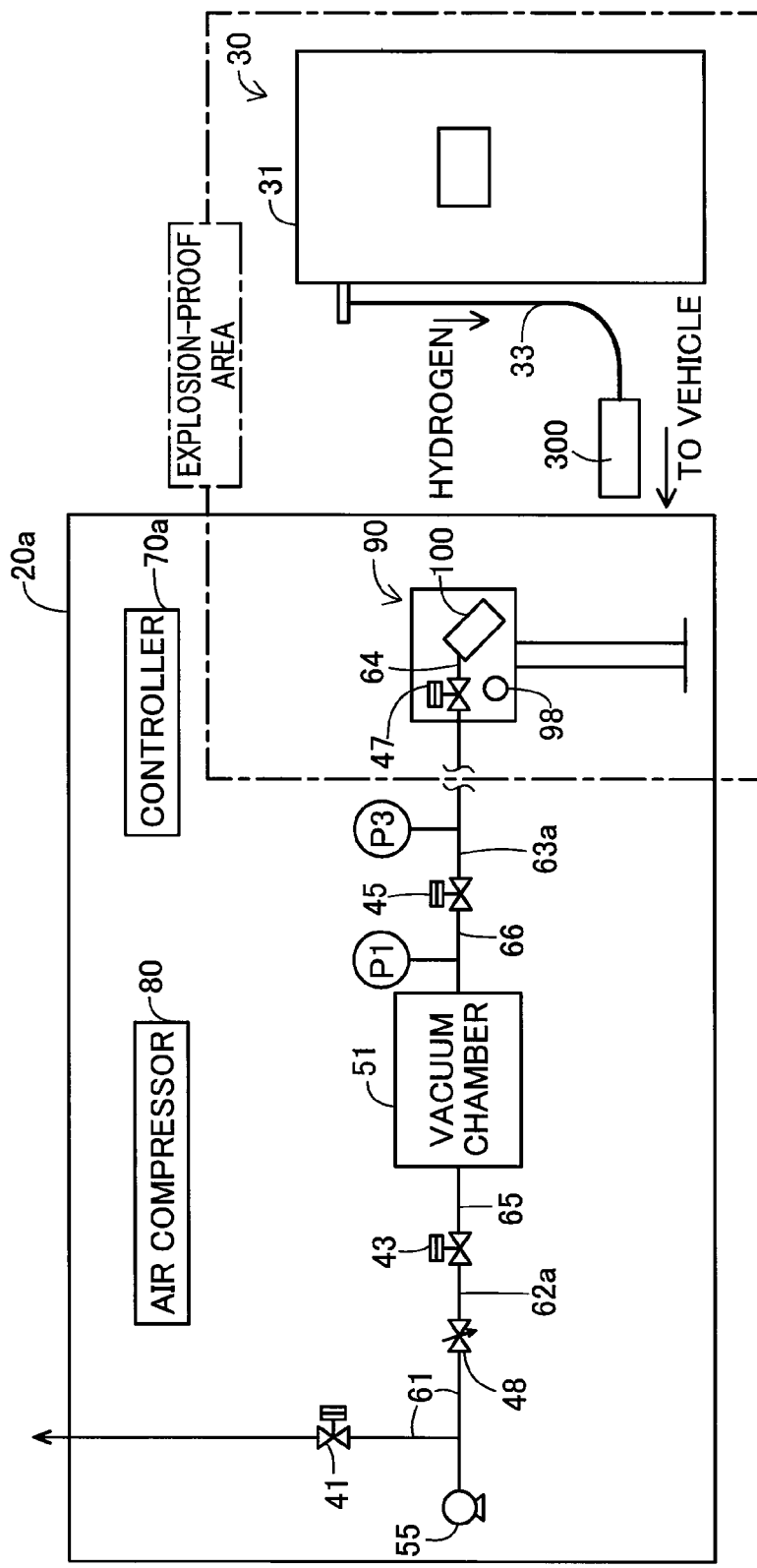
FIG. 18 is a diagram illustrating a suction device and a hydrogen dispenser according to a second embodiment.

The following describes a second embodiment. FIG. 18 illustrates a suction device 20a and a hydrogen dispenser 30.

The suction device 20a is used instead of the suction device 20 of the first embodiment. As shown in FIG. 18, the suction device 20a has only one vacuum chamber, i.e., only a first vacuum chamber 51. The suction device 20a accordingly has pipes and valves corresponding to only the first vacuum chamber 51.

The like components of the suction device 20a to those of the suction device 20 are expressed by the like signs and are not specifically described here. The following describes the differences from the first embodiment.

A second pipe 62a has no branch unlike the second pipe 62 and is arranged to connect the flow regulating valve 48 with the third valve 43. A third pipe 63a has no branch unlike the third pipe 63 and is arranged to connect the fifth valve 45 and the seventh valve 47. A controller 70a performs different processing flows from those of the controller 70, due to the presence of only one vacuum chamber.

Figure 19:
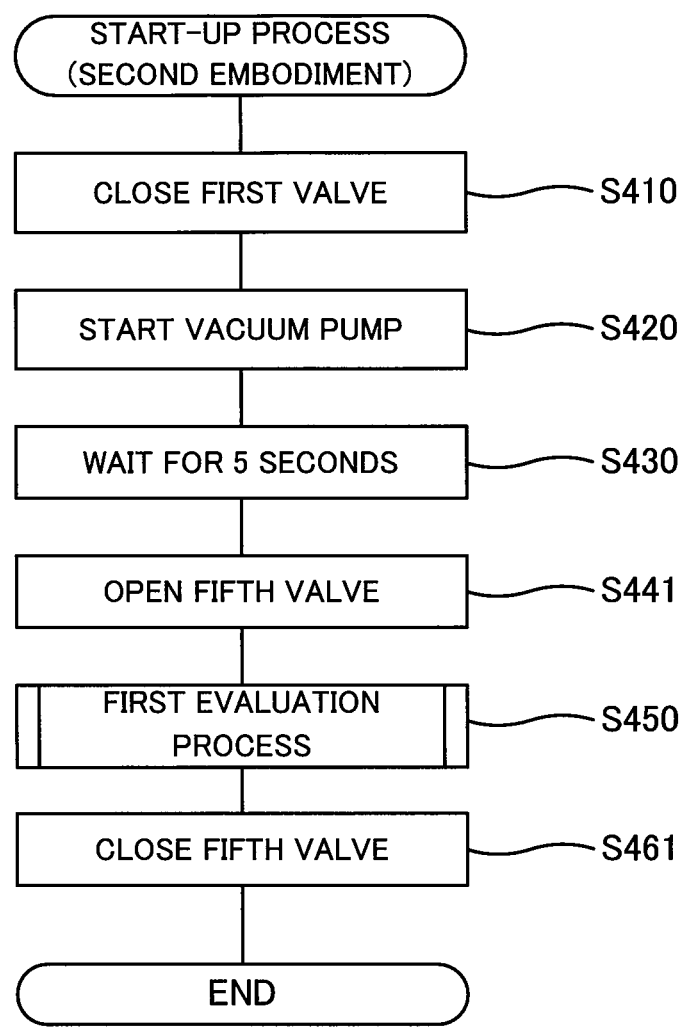
FIG. 19 is a flowchart showing a start-up process of the second embodiment.

FIG. 19 is a flowchart showing a start-up process according to the second embodiment. This start-up process is performed by the controller 70a. As shown in FIG. 19, the second evacuation process is omitted from the start-up process of the first embodiment. Additionally, steps S440 and S460 are replaced with steps S441 and S461. Unlike steps S440 and S460, the object of steps S441 and S461 is the fifth valve 45. The other steps are the same as those of the first embodiment and are not specifically described.

Figure 20:
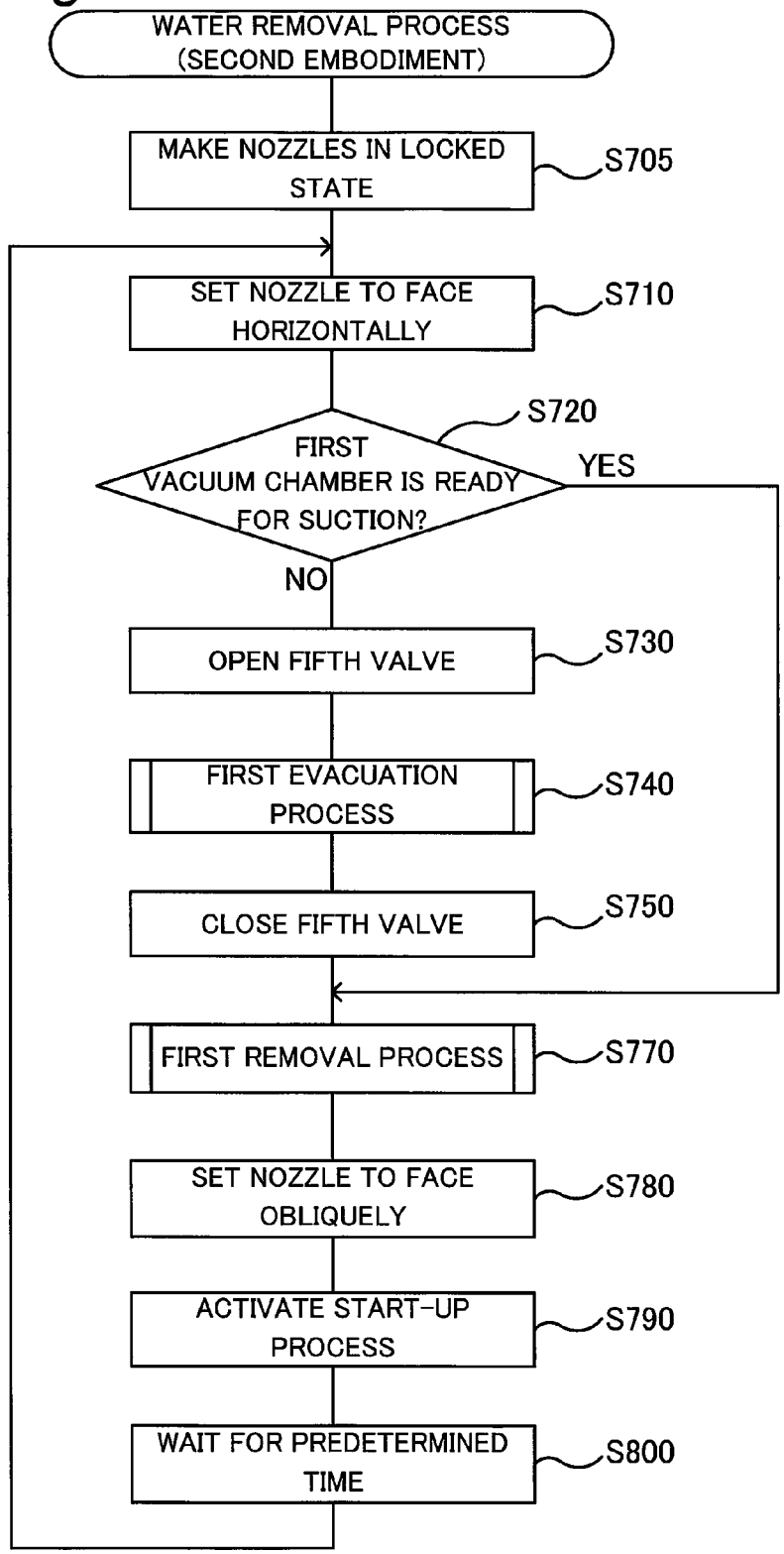
FIG. 20 is a flowchart showing a water removal process of the second embodiment.

FIG. 20 is a flowchart showing a water removal process according to the second embodiment. This water removal process is performed by the controller 70a. The conditions for starting and terminating this water removal process are the same as those of the first embodiment.

The controller 70a first makes the suction nozzle 100 and the filling nozzle 300 in the locked state (step S705) and sets the suction nozzle 100 to face in the horizontal direction (step S710). The controller 70a subsequently determines whether the first vacuum chamber 51 is ready for suction (step S720).

When the first vacuum chamber 51 is not ready for suction (step S720: NO), the controller 70a opens the fifth valve 45 (step S730), performs the first evacuation process (step S740), closes the fifth valve 45 (step S750) and performs the first removal process (step S770). The first removal process is the same as that of the first embodiment. When the first vacuum chamber 51 is ready for suction (step S720: YES), on the other hand, the controller 70a performs the first removal process (step S770) without the processing of steps S730 to S750.

After completion of the first removal process (step S770), the controller 70a sets the suction nozzle 100 to face obliquely downward (step S780), activates the start-up process (step S790), waits for a predetermined time (step S800) and returns to step S710.

The second embodiment uses the suction device 20a of the simplified configuration to allow for suction by the first vacuum chamber 51.

The following describes a third embodiment. The third embodiments uses a suction nozzle 100a in place of the suction nozzle 100. The other configuration of the third embodiment is similar to that of the first embodiment and is not specifically described here.

Figure 21:
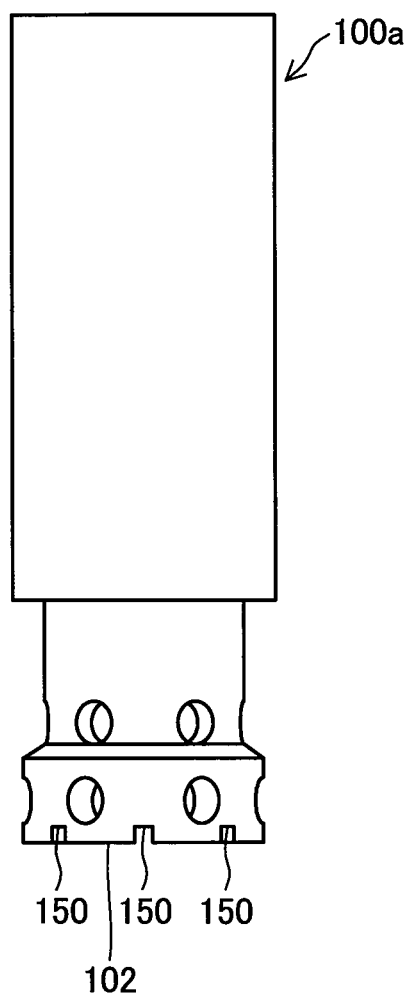
FIG. 21 is a front view illustrating a suction nozzle according to a third embodiment.

FIG. 21 is a front view illustrating the suction nozzle 100a. The suction nozzle 100a has grooves 150 provided at the opening 104 as shown in FIG. 21.

Figure 22:
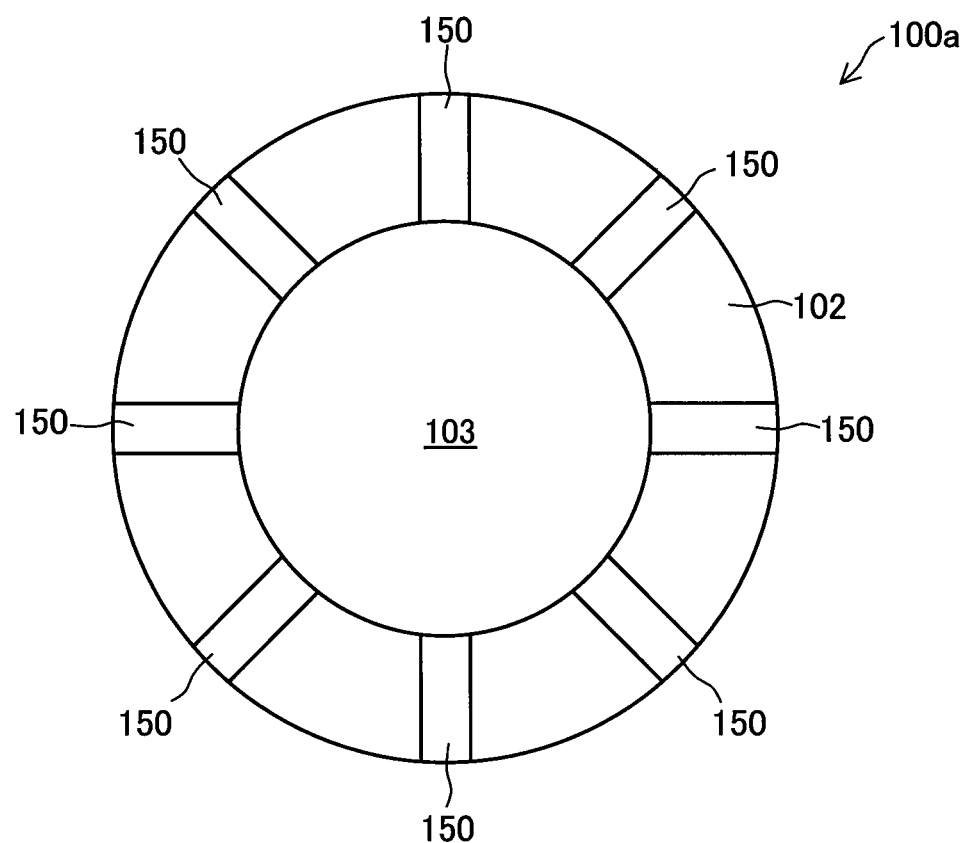
FIG. 22 is a bottom view illustrating the suction nozzle of the third embodiment.

FIG. 22 is a bottom view illustrating the suction nozzle 100a. As shown in FIG. 22, eight grooves 150 are provided to serve as flow paths of connecting the hollow region 103 with the outside.

Figure 23:
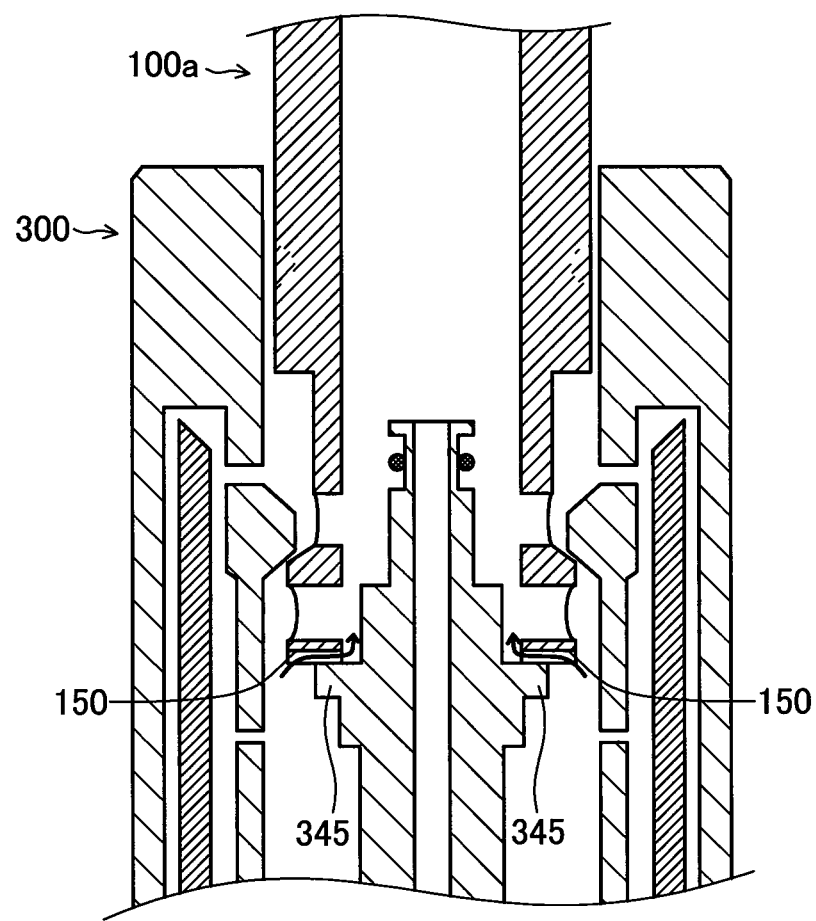
FIG. 23 is a sectional view illustrating the engaged state according to the third embodiment.

FIG. 23 is a sectional view illustrating the engaged state according to the third embodiment. As shown in FIG. 23, suction makes the flows in the grooves 150. These flows effectively remove the water at the abutting element 345 in the vicinity of the leading end 102 of the suction nozzle 100a.

The disclosure is not limited to any of the embodiments, the examples and the modifications described above but may be implemented by a diversity of other configurations without departing from the scope of the disclosure. For example, the technical features of any of the embodiments, examples and modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein. Some of possible modifications are given below.

The vacuum chamber is not limited to the configuration described in any of the above embodiments but may have any configuration having the functions described above. More specifically, the vacuum chamber may have any configuration that allows for connection with a suction nozzle by piping and meets the required specifications of the capacity and the ultimate vacuum. For example, an expanded diameter portion of the piping having the above functions may be included in the vacuum chamber of this disclosure. A longer piping to have the increased internal volume of the piping may also be included in the vacuum chamber of this disclosure.

At least one of the vacuum chambers and the vacuum pump may be placed in the explosion-proof area.

Suction of the filling nozzle may not be repeatedly performed automatically. For example, suction of the filling nozzle may be performed in response to the operator's instruction.

The number of vacuum chambers may be three or more.

With regard to rotation of the suction nozzle, the angle of the suction nozzle in the standby state and the angle during suction may be changed to any angles. For example, the angle in the standby state may be set to any angle that facilitates the operator's operation by taking into account the arrangement of the suction nozzle 100. The angle during suction may be upward in the direction of gravity, in order to give preference to the water removal effect. The arrangement of the suction nozzle to face upward in the direction of gravity increases the load applied to the supply hose. When a flexible material is employed for the supply hose, however, the arrangement of the suction nozzle to face upward in the direction of gravity does not increase the load applied to the supply hose.

The mechanism of automatically rotating the suction nozzle may be omitted. For example, a mechanism of manually rotating the suction nozzle may be provided, or the suction nozzle may be configured in a non-rotatable manner.

The first embodiment uses the first vacuum chamber preferentially, but the use frequency may be equalized between the first vacuum chamber and the second vacuum chamber.

The above embodiments describe the configurations including only one filling nozzle and only one suction device. The numbers of the filling nozzles and the suction devices are, however, not specifically limited. For example, in a configuration that includes a plurality of (for example, two) filling nozzles, providing a plurality of vacuum chambers like the first embodiment enables suction using only one suction device to be started immediately after completion of hydrogen filling by each of the filling nozzles.

An O ring may be used to seal the clearance between the outer wall surface of the suction nozzle and the inner wall surface of the filling nozzle in the engaged state. For example, an O ring is provided on the outer wall of the suction nozzle.

The filling nozzle and the suction nozzle may be locked and unlocked by a technique that does not use any drive unit. For example, the filling nozzle and the suction nozzle may be locked by a mechanism such as a spring by the operator's insertion. The filling nozzle and the suction nozzle may be unlocked manually by releasing this mechanism.

The above embodiments use only one switch, but a plurality of switches may be provided. For example, rotation of the suction nozzle and start of suction may be triggered by operations of separate switches.

In the embodiments described above, only one controller is provided to control all the valves in the suction device, the vacuum pump, rotation of the suction nozzle and the drive unit in the filling nozzle. A plurality of controllers may be provided to share these controls. In this latter configuration, each controller may adequately output signals to another controller.

In the embodiments described above, the reduced diameter portion suction holes and the flange portion suction holes are provided as circular through holes. The through holes may be formed in any suitable shape, for example, elliptical shape or rectangular shape. The numbers of the reduced diameter portion suction holes and the flange portion suction holes are not specifically limited. The reduced diameter portion suction holes and the flange portion suction holes may be formed in different shapes.

In the first and the second removal processes, the vacuum pump as well as the vacuum chamber may be used for suction of the suction nozzle.

A timeout error may be provided in the determination of step S453 in the first <second> evacuation process. A timeout error may also be provided in the determination steps of the first <second> removal processes and the piping evacuation process.

The numerical values described in the embodiments are only illustrative and may be changed as appropriate.

What is claimed is:

1. A suction device that sucks inside of a filling nozzle used for supply of hydrogen, the suction device comprising:
a suction nozzle configured to be engaged with the filling nozzle;
a vacuum chamber configured to suck inside of the suction nozzle; and
a vacuum pump configured to evacuate the vacuum chamber; further comprising a controller, wherein the controller is configured to: determine a degree of vacuum of the vacuum chamber, in response to the degree of vacuum of the vacuum chamber being above a predetermined vacuum value, perform an evacuation process which causes the vacuum pump to evacuate the vacuum chamber, and in response to the degree of vacuum of the vacuum chamber being below the predetermined vacuum value, perform a removal process which allows pressure in the vacuum chamber to be increased by sucking inside of the suction nozzle.

2. The suction device according to claim 1, wherein at least either the vacuum chamber or the vacuum pump is located in a place that does not require hydrogen explosion protection.

3. The suction device according to claim 1, wherein suction of the suction nozzle by the vacuum chamber is performed in response to an operator's instruction and is then performed again after a predetermined time interval.

4. The suction device according to claim 1, further comprising
a mechanism configured to change and set a depression angle of the suction nozzle.

5. The suction device according to claim 4, wherein the mechanism sets the depression angle to face the suction nozzle upward during suction by the vacuum chamber, compared with a state that the suction nozzle and the filling nozzle are not engaged with each other.

6. The suction device according to claim 4, wherein the mechanism sets the suction nozzle to face in a horizontal direction when suction by the vacuum chamber is performed.

7. The suction device according to claim 4, wherein the mechanism sets the depression angle to 45 degrees when suction by the vacuum chamber is not performed.

8. The suction device according to claim 1, comprising a plurality of the vacuum chambers.

9. The suction device according to claim 8, wherein during suction of the suction nozzle by one of the plurality of vacuum chambers, another of the plurality of vacuum chambers is evacuated by the vacuum pump.

10. The suction device according to claim 1, wherein suction power by the vacuum chamber is higher than suction power by the vacuum pump.

11. A suction method that sucks inside of a filling nozzle used for supply of hydrogen by using a suction nozzle that is engaged with the filling nozzle, the suction method comprising:
evacuating a vacuum chamber by using a vacuum pump; and
sucking inside of the suction nozzle by using the evacuated vacuum chamber; further comprising: determining a degree of vacuum of the vacuum chamber, in response to the degree of vacuum of the vacuum chamber being above a predetermined vacuum value, performing an evacuation process which causes the vacuum pump to evacuate the vacuum chamber, and in response to the degree of vacuum of the vacuum chamber being below the predetermined vacuum value, performing a removal process which allows pressure in the vacuum chamber to be increased by sucking inside of the suction nozzle.

* * * * *